US012737063B2

(12) United States Patent
Wang et al.

(10) Patent No.: US 12,737,063 B2
(45) Date of Patent: Sep. 15, 2026

(54) TOUCH CONTROL STRUCTURE AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Lingran Wang, Beijing (CN); Yang Yang, Beijing (CN); Jaeseung Kim, Beijing (CN); Jun Yan, Beijing (CN); Zhiliang Jiang, Beijing (CN); Gukhwan Song, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 19/072,253

(22) Filed: Mar. 6, 2025

(65) Prior Publication Data

US 2025/0199635 A1 Jun. 19, 2025

Related U.S. Application Data

(63) Continuation of application No. 18/630,999, filed on Apr. 9, 2024, now Pat. No. 12,271,546, which is a (Continued)

(51) Int. Cl.
*G06F 3/041* (2006.01)
*G06F 3/033* (2013.01)
(Continued)

(52) U.S. Cl.
CPC .......... *G06F 3/0412* (2013.01); *G06F 3/0443* (2019.05); *G06F 3/0446* (2019.05);
(Continued)

(58) Field of Classification Search
CPC .... G06F 3/0412; G06F 3/0443; G06F 3/0446; G06F 3/0448; G06F 2203/04111;
(Continued)

(56) References Cited

U.S. PATENT DOCUMENTS

2012/0019450 A1 1/2012 Huang et al.
2013/0154996 A1 6/2013 Trend et al.
(Continued)

FOREIGN PATENT DOCUMENTS

CN 104182081 A 12/2014
CN 107977112 A 5/2018
(Continued)

OTHER PUBLICATIONS

First Office Action in the Chinese Patent Application No. 202180001501.X, dated Apr. 21, 2026; English translation attached.

*Primary Examiner* — Douglas Wilson
(74) *Attorney, Agent, or Firm* — Intellectual Valley Law, P.C.

(57) ABSTRACT

A touch control structure includes a plurality of first mesh electrodes respectively in a plurality of rows and a plurality of second mesh electrodes respectively in a plurality of columns. A respective one of the plurality of second mesh electrodes includes a plurality of second mesh blocks consecutively connected in a respective column. In at least a portion of the touch control structure having at least four of the plurality of second mesh blocks, inside an area defined by an active pen sensing range with reference to any point in the portion of the touch control structure, an electrode ratio of a first occupied area actually occupied by mesh lines of first mesh electrodes to a second occupied area actually occupied by mesh lines of second mesh electrodes is in a range of 0.8 to 1.2.

16 Claims, 13 Drawing Sheets

Related U.S. Application Data continuation of application No. 17/762,346, filed as application No. PCT/CN2021/099055 on Jun. 9, 2021, now Pat. No. 11,983,341.

(51) Int. Cl.
*G06F 3/0354* (2013.01)
*G06F 3/044* (2006.01)

(52) U.S. Cl.
CPC .......... *G06F 3/033* (2013.01); *G06F 3/03545* (2013.01); *G06F 3/0448* (2019.05); *G06F 2203/04101* (2013.01); *G06F 2203/04108* (2013.01); *G06F 2203/04111* (2013.01); *G06F 2203/04112* (2013.01); *G06F 2203/04114* (2019.05)

(58) Field of Classification Search
CPC . G06F 2203/04112; G06F 2203/04103; G06F 3/033; G06F 3/03545; G06F 2203/04101; G06F 2203/04108; G06F 2203/04114
See application file for complete search history.

(56) References Cited

U.S. PATENT DOCUMENTS

| | | | | |
|---|---|---|---|---|
| 2014/0293163 | A1* | 10/2014 | Ju | G06F 3/0443 349/12 |
| 2014/0362035 | A1* | 12/2014 | Mo | G06F 3/0443 345/174 |
| 2018/0113559 | A1* | 4/2018 | Bae | G06F 3/03545 |
| 2019/0102014 | A1* | 4/2019 | Gur | G06F 3/041661 |
| 2020/0174589 | A1* | 6/2020 | Hara | G06F 3/03545 |
| 2021/0397297 | A1* | 12/2021 | Ding | G06F 3/0443 |
| 2022/0091698 | A1* | 3/2022 | Kadowaki | G06F 3/03545 |
| 2022/0229514 | A1* | 7/2022 | Park | G06F 3/03545 |
| 2022/0317817 | A1* | 10/2022 | Lim | G06F 3/0446 |
| 2022/0391066 | A1* | 12/2022 | Yang | G06F 3/04162 |
| 2023/0359310 | A1* | 11/2023 | Kadowaki | G06F 3/044 |

FOREIGN PATENT DOCUMENTS

| | | | |
|---|---|---|---|
| CN | 110764660 | A | 2/2020 |
| CN | 111506218 | A | 8/2020 |
| JP | 2018060345 | A | 4/2018 |

* cited by examiner

TOUCH CONTROL STRUCTURE AND DISPLAY APPARATUS

CROSS-REFERENCE TO RELATED APPLICATION

This application is a continuation of U.S. application Ser. No. 18/630,999, filed Apr. 9, 2024, which is a continuation of U.S. application Ser. No. 17/762,346, filed Jun. 9, 2021, which is a national stage application under 35 U.S.C. § 371 of International Application No. PCT/CN2021/099055, filed Jun. 9, 2021. Each of the forgoing applications is herein incorporated by reference in its entirety for all purposes.

TECHNICAL FIELD

The present invention relates to display technology, more particularly, to a touch control structure and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch control structure, comprising a plurality of first mesh electrodes respectively in a plurality of rows and a plurality of second mesh electrodes respectively in a plurality of columns; wherein a respective one of the plurality of second mesh electrodes comprises a plurality of second mesh blocks consecutively connected in a respective column; wherein, in at least a portion of the touch control structure having at least four of the plurality of second mesh blocks, inside an area defined by an active pen sensing range with reference to any point in the portion of the touch control structure, an electrode ratio of a first occupied area actually occupied by mesh lines of first mesh electrodes to a second occupied area actually occupied by mesh lines of second mesh electrodes is in a range of 0.8 to 1.2; and the active pen sensing range has a size between ¼ and ⅓ of a size of an area of a smallest convex polygon that encircles a respective second mesh block of the plurality of second mesh blocks.

Optionally, the electrode ratio in the smallest convex polygon is in a range of 0.8 to 1.2.

Optionally, inside any area having a size between 1/20 and ⅙ of the size of the area of the smallest convex polygon, with reference to any point in the portion of the touch control structure, an electrode ratio is in a range of 0.8 to 1.2.

Optionally, the respective second mesh block has a substantially ⊃⊂ shape, and the smallest convex polygon has a rectangular shape.

Optionally, the active pen sensing range is a sensing range of an active pen comprising a tip having a diameter in a range of 0.8 mm to 2.0 mm.

Optionally, the area of the smallest convex polygon is in a range of 12.25 $mm^2$ to 16.00 $mm^2$.

Optionally, a respective one of the plurality of first mesh electrodes comprises a plurality of first mesh blocks and a plurality of third mesh blocks alternately arranged in a respective row.

Optionally, the electrode ratio in a smallest convex polygon that encircles a respective first mesh block of the plurality of first mesh blocks is in a range of 0.8 to 1.2.

Optionally, the electrode ratio in a smallest convex polygon that encircles a respective third mesh block of the plurality of third mesh blocks is in a range of 0.5 to 1.5.

Optionally, in at least the portion of the touch control structure, inside the area defined by the active pen sensing range with reference to any point in the portion of the touch control structure, at least a portion of a dummy electrode is present.

Optionally, a respective one of the plurality of first mesh electrodes comprises a plurality of first mesh blocks and a plurality of third mesh blocks alternately arranged in a respective row; the respective second mesh block is in a space between a first adjacent third mesh block, a second adjacent third mesh block, a first adjacent first mesh block, a second adjacent first mesh block, a third adjacent first mesh block, and a fourth adjacent first mesh block; a first portion of a respective third mesh block extends into a space between branches of a first adjacent second mesh block; and a second portion of the respective third mesh block extends into a space between branches of a second adjacent second mesh block.

Optionally, two adjacent second mesh blocks in a first adjacent column of second mesh blocks are connected through at least a first conductive bridge crossing over the respective one of the plurality of first mesh electrodes; two adjacent second mesh blocks in a second adjacent column of second mesh blocks are connected through at least a third conductive bridge crossing over the respective one of the plurality of first mesh electrodes; and the first conductive bridge and the third conductive bridge respectively cross over respective conductive channels connecting respective adjacent pairs of first mesh block and third mesh block.

Optionally, a respective second mesh block of the plurality of second mesh blocks comprises a connecting portion, a first branch, a second branch, a third branch, and a fourth branch, the first branch, the second branch, the third branch, and the fourth branch respectively connected to the connecting portion.

Optionally, two adjacent second mesh blocks in a first adjacent column of second mesh blocks are connected respectively through a first conductive bridge and a second conductive bridge respectively crossing over the respective one of the plurality of first mesh electrodes; two adjacent second mesh blocks in a second adjacent column of second mesh blocks are connected respectively through a third conductive bridge and a fourth conductive bridge respectively crossing over the respective one of the plurality of first mesh electrodes; a respective third mesh block of the plurality of third mesh blocks is in a space between the first conductive bridge and the second conductive bridge in the first adjacent column; a respective first mesh block of the plurality of first mesh blocks is in a space between the fourth conductive bridge in the second adjacent column and the first conductive bridge in the first adjacent column; and the respective third mesh block of the plurality of third mesh blocks is in a space between the third branch and the fourth branch of a first adjacent second mesh block, the first branch and the second branch of a second adjacent second mesh block, the first conductive bridge in the first adjacent column, and the second conductive bridge in the first adjacent column, the first adjacent second mesh block and the second adjacent second mesh block being in the first adjacent column, the first conductive bridge in the first adjacent column connecting the third branch of the first adjacent second mesh block and the first branch of the second adjacent second mesh block, the second conductive bridge in the first adjacent column connecting the fourth branch of the first adjacent second mesh block and the second branch of the second adjacent second mesh block.

Optionally, a first portion of the respective third mesh block extends into a space between the third branch and the fourth branch of a first adjacent second mesh block; and a second portion of the respective third mesh block extends into a space between the first branch and the second branch of a second adjacent second mesh block.

Optionally, two adjacent second mesh blocks in a first adjacent column of second mesh blocks are connected respectively through a first conductive bridge and a second conductive bridge respectively crossing over the respective one of the plurality of first mesh electrodes; two adjacent second mesh blocks in a second adjacent column of second mesh blocks are connected respectively through a third conductive bridge and a fourth conductive bridge respectively crossing over the respective one of the plurality of first mesh electrodes; a respective third mesh block of the plurality of third mesh blocks is in a space between the first conductive bridge and the second conductive bridge in the first adjacent column; a respective first mesh block of the plurality of first mesh blocks is in a space between the fourth conductive bridge in the second adjacent column and the first conductive bridge in the first adjacent column; and the respective first mesh block of the plurality of first mesh blocks is in a space between the third branch of a first adjacent second mesh block, the first branch of a second adjacent second mesh block, the fourth branch of a third adjacent second mesh block, the second branch of a fourth adjacent second mesh block, the fourth conductive bridge in the second adjacent column, and the first conductive bridge in the first adjacent column, the first adjacent second mesh block and the second adjacent second mesh block being in the first adjacent column, the third adjacent second mesh block and the fourth adjacent second mesh block being in the second adjacent column, the first conductive bridge in the first adjacent column connecting the third branch of the first adjacent second mesh block and the first branch of the second adjacent second mesh block, the fourth conductive bridge in the second adjacent column connecting the fourth branch of the third adjacent second mesh block and the second branch of the fourth adjacent second mesh block.

Optionally, a first portion of the respective first mesh block extends into a space between the third branch of the first adjacent second mesh block and the fourth branch of the third adjacent second mesh block; and a second portion of the respective first mesh block extends into a space between the first branch of the second adjacent second mesh block and the second branch of the fourth adjacent second mesh block.

In another aspect, the present disclosure provides a display apparatus, comprising a display panel, the touch control structure described herein or fabricated by a method described herein on the display panel, and a plurality of touch control integrated circuits connect to the touch control structure.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1A:
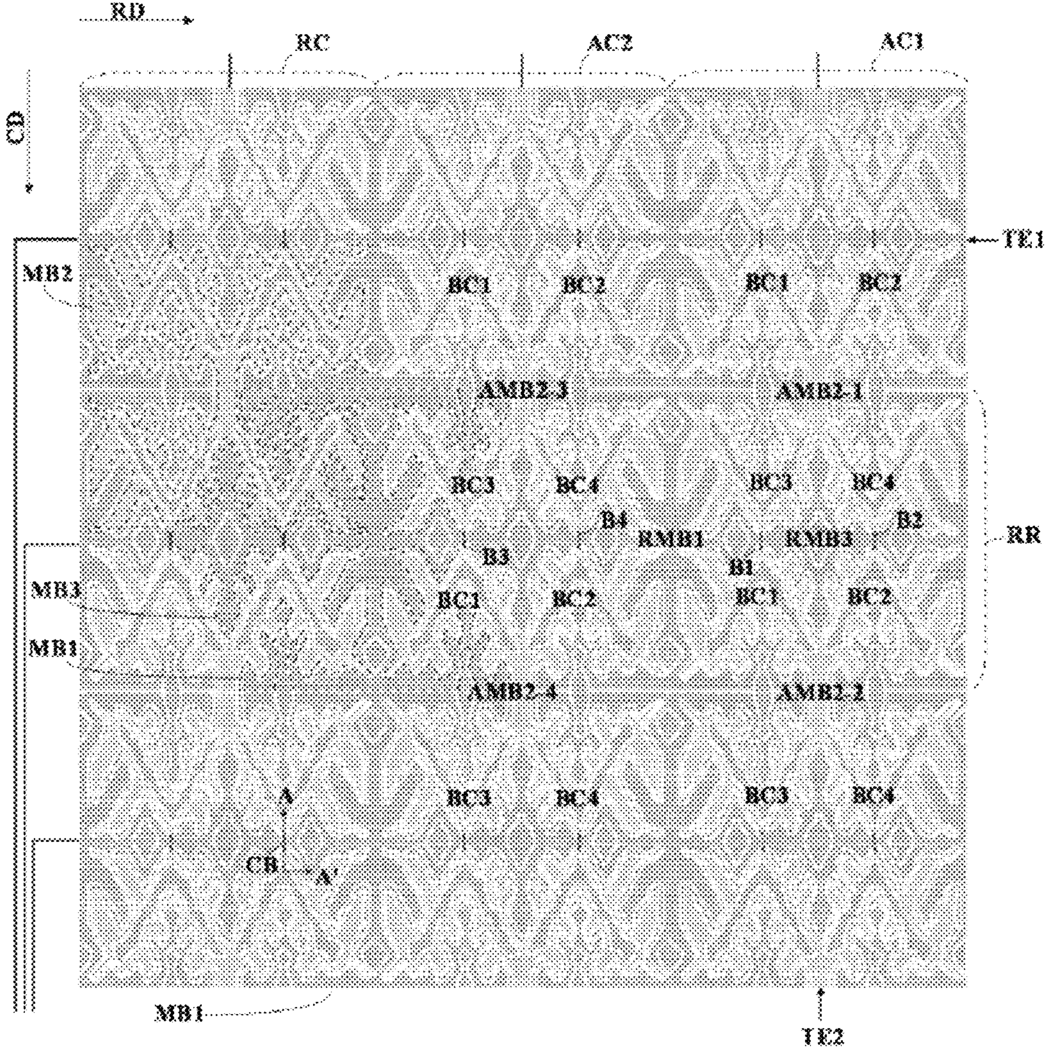
FIG. 1A is a schematic diagram illustrating the structure of a touch control structure in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure and a display apparatus that substantially obviate one or more of the problems due to limitations and disadvantages of the related art. In one aspect, the present disclosure provides a touch control structure. In some embodiments, the touch control structure includes a plurality of first mesh electrodes respectively in a plurality of rows and a plurality of second mesh electrodes respectively in a plurality of columns. Optionally, a respective one of the plurality of second mesh electrodes comprises a plurality of second mesh blocks consecutively connected in a respective column. Optionally, a respective one of the plurality of first mesh electrodes comprises a plurality of first mesh blocks and a plurality of third mesh blocks alternately arranged in a respective row. Optionally, two adjacent second mesh blocks in a first adjacent column of second mesh blocks are connected respectively through a first conductive bridge and a second conductive bridge respectively crossing over the respective one of the plurality of first mesh electrodes. Optionally, two adjacent second mesh blocks in a second adjacent column of second mesh blocks are connected respectively through a third conductive bridge and a fourth conductive bridge respectively crossing over the respective one of the plurality of first mesh electrodes. Optionally, a respective third mesh block of the plurality of third mesh blocks is in a space between the first conductive bridge and the second conductive bridge in the first adjacent column. Optionally, a respective first mesh block of the plurality of first mesh blocks is in a space between the fourth conductive bridge in the second adjacent column and the first conductive bridge in the first adjacent column.

Flexible multi-layer on-cell touch (FMLOC) technology is utilized to form mesh electrode pattern on top of an encapsulating layer of a display panel. The mesh electrode pattern includes touch scanning electrodes and touch sensing electrodes, and optionally fill patterns ("dummy patterns"). A touch detection integrated circuit is configured to detect a touch by sensing a mutual capacitance between a touch scanning electrode and a touch sensing electrode, and a change of the mutual capacitance upon a touch. Mesh electrodes includes mesh lines typically have a line width in a range of 1 μm to 50 μm. Thus, connecting adjacent mesh blocks through the mesh lines is particularly difficult, and often resulting in poor connectivity. The present disclosure adopts a novel and advantageous touch electrode design that obviate issues in related touch control structures.

FIG. 1A is a schematic diagram illustrating the structure of a touch control structure in some embodiments according to the present disclosure. Referring to FIG. 1A, the touch control structure in some embodiments includes a plurality of first mesh electrodes TE1 arranged in a plurality of rows and a plurality of second mesh electrodes TE2 arranged in a plurality of columns. The plurality of first mesh electrodes TE1 are arranged in a plurality of rows, each of the plurality of rows is a respective one of the plurality of first mesh electrodes TE1. The plurality of second mesh electrodes TE2 are arranged in a plurality of columns, each of the plurality of columns is a respective one of the plurality of second mesh electrodes TE2. Optionally, the touch control structure is a mutual capacitance type touch control structure. Optionally, the plurality of first mesh electrodes TE1 are a plurality of touch sensing electrodes, and the plurality of second mesh electrodes TE2 are a plurality of touch scanning electrodes. Optionally, the plurality of first mesh electrodes TE1 are a plurality of touch scanning electrodes, and the plurality of second mesh electrodes TE2 are a plurality of touch sensing electrodes.

Referring to FIG. 1A, in some embodiments, a respective one of the plurality of second mesh electrodes TE2 includes a plurality of second mesh blocks MB2 consecutively connected in a respective column RC. A respective one of the plurality of first mesh electrodes TE1 includes a plurality of first mesh blocks MB1 and a plurality of third mesh blocks MB3 alternately arranged in a respective row RC (e.g., in a first mesh block-third mesh block-first mesh block-third mesh block-first mesh block-third mesh block fashion). In one example depicted in FIG. 1A, a width along a row direction RD of the respective first mesh block RMB1 is greater than a width along the row direction of the respective third mesh block RMB3, and a width along a column direction CD of the respective first mesh block RMB1 is greater than a width along the column direction of the respective third mesh block RMB3. Alternatively, a width along a row direction RD of the respective first mesh block RMB1 is smaller than a width along the row direction of the respective third mesh block RMB3, and a width along a column direction CD of the respective first mesh block RMB1 is smaller than a width along the column direction of the respective third mesh block RMB3. Alternatively, a width along a row direction RD of the respective first mesh block RMB1 is substantially the same as a width along the row direction of the respective third mesh block RMB3, and a width along a column direction CD of the respective first mesh block RMB1 is substantially the same as a width along the column direction of the respective third mesh block RMB3. In one example, the respective first mesh block RMB1 and the respective third mesh block RMB3 have different shapes. In another example, the respective first mesh block RMB1 and the respective third mesh block RMB3 have different occupied areas.

In some embodiments, the touch control structure further includes a plurality of conductive bridges for connecting adjacent mesh blocks. Referring to FIG. 1A again, in some embodiments, two adjacent second mesh blocks (e.g., AMB2-1 and AMB2-2) in a first adjacent column AC1 of second mesh blocks are connected respectively through a first conductive bridge B1 and a second conductive bridge B2 respectively crossing over the respective one of the plurality of first mesh electrodes TE1. Two adjacent second mesh blocks (e.g., AMB2-3 and AMB2-4) in a second adjacent column AC2 of second mesh blocks are connected respectively through a third conductive bridge B3 and a fourth conductive bridge B4 respectively crossing over the respective one of the plurality of first mesh electrodes TE1. A respective third mesh block RMB3 of the plurality of third mesh blocks is in a space between the first conductive bridge B1 and the second conductive bridge B2 in the first adjacent column AC1. A respective first mesh block RMB1 of the plurality of first mesh blocks is in a space between the fourth conductive bridge B4 in the second adjacent column AC2 and the first conductive bridge B1 in the first adjacent column AC1. The first conductive bridge B1, the second conductive bridge B2, the third conductive bridge B3, and the fourth conductive bridge B4 respectively cross over respective conductive channels CC connecting respective adjacent pairs of first mesh block and third mesh block.

Figure 2:
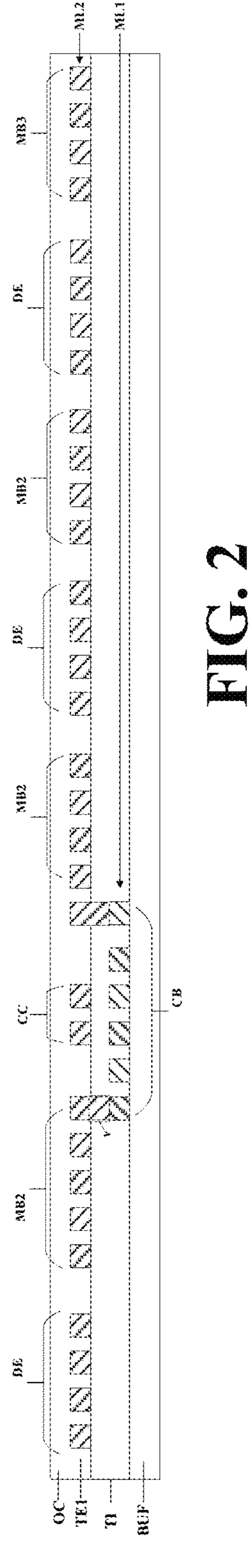
FIG. 2 is a cross-sectional view along an A-A' line in FIG. 1A.

FIG. 2 is a cross-sectional view along an A-A' line in FIG. 1A. Referring to FIG. 1A and FIG. 2, a respective one of the plurality of second mesh electrodes TE2 includes a plurality of second mesh blocks MB2 and a plurality of conductive bridges CB in a respective column. The plurality of second mesh blocks MB2 are consecutively electrically connected respectively through the plurality of conductive bridges CB.

In some embodiments, the touch control structure includes a buffer layer BUF, the plurality of conductive bridges CB on the buffer layer BUF, a touch insulating layer TI on a side of the plurality of conductive bridges CB away from the buffer layer BUF, the plurality of first mesh blocks MB1, the plurality of second mesh blocks MB2, and the plurality of third mesh blocks MB3 on a side of the touch insulating layer TI away from the plurality of conductive bridges CB, and an overcoat layer OC on a side of the plurality of first mesh blocks MB1, the plurality of second mesh blocks MB2, and the plurality of third mesh blocks MB3 away from the touch insulating layer TI. A respective conductive bridge of the plurality of conductive bridges CB are respectively electrically connected to two adjacent second mesh blocks respectively through vias extending through the touch insulating layer TI. Respective conductive channels CC connect respective adjacent pairs of first mesh block and third mesh block. The respective conductive bridge of the plurality of conductive bridges CB crosses over the respective conductive channel CC.

As shown in FIG. 2, the plurality of conductive bridges CB is in a first metal layer ML1 of the touch control structure. The plurality of first mesh blocks MB1, the plurality of second mesh blocks MB2, the plurality of third mesh blocks MB3, and the respective conductive channel CC are in a second metal layer ML2 of the touch control structure.

Figure 3:
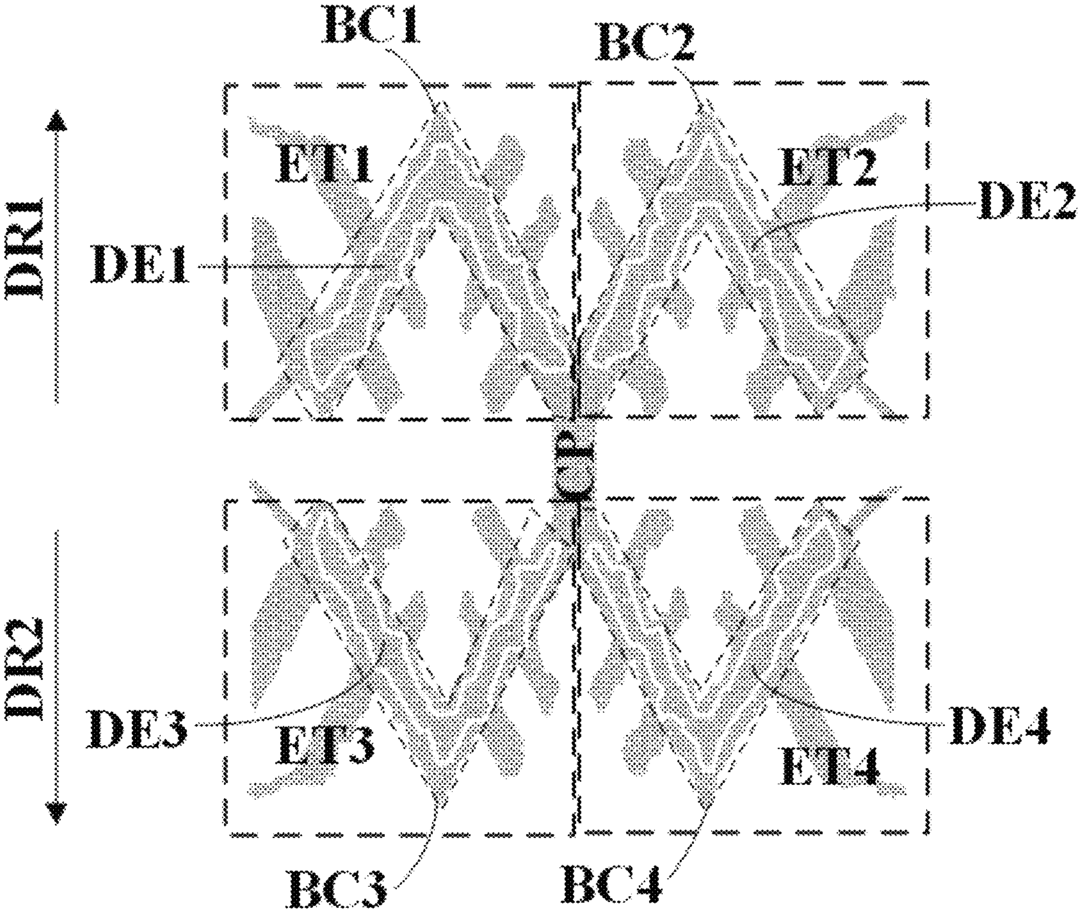
FIG. 3 is a schematic diagram illustrating the structure of a respective second mesh block of a plurality of second mesh blocks in a touch control structure in some embodiments according to the present disclosure.

FIG. 3 is a schematic diagram illustrating the structure of a respective second mesh block of a plurality of second mesh blocks in a touch control structure in some embodiments according to the present disclosure. Referring to FIG. 3, the respective second mesh block RMB2 of the plurality of second mesh blocks MB2 in some embodiments includes a connecting portion CP, a first branch BC1, a second branch BC2, a third branch BC3, and a fourth branch BC4, the first branch BC1, the second branch BC2, the third branch BC3, and the fourth branch BC4 respectively connected to the connecting portion CP.

In some embodiments, each of the first branch BC1, the second branch BC2, the third branch BC3, and the fourth branch BC4 has a substantially V shape. Optionally, a combination of the first branch BC1 and the second branch BC2 has a substantially M shape. Optionally, a combination of the third branch BC3 and the fourth branch BC4 has a substantially W shape. Optionally, a combination of the first branch BC1, the second branch BC2, the third branch BC3, the fourth branch BC4, and the connecting portion CP has a substantially ƆC shape.

In some embodiments, apexes of the first branch BC1 and the second branch BC2 point toward a first direction DR1; and apexes of the third branch BC3 and the fourth branch BC4 point toward a second direction DR2 opposite to the first direction DR1. Optionally, the first direction DR1 and the second direction DR2 are substantially parallel to an extension direction of the plurality of second mesh blocks MB2 in a respective one of the plurality of second mesh electrode TE2, e.g., the column direction CD in FIG. 1A. Optionally, the first direction DR1 and the second direction DR2 are substantially parallel to an extension direction of the connecting portion CP. As used herein, the term "substantially parallel" means that an angle between two directions is in the range of 0 degree to approximately 45 degrees, e.g., 0 degree to approximately 5 degrees, 0 degree to approximately 10 degrees, 0 degree to approximately 15 degrees, 0 degree to approximately 20 degrees, 0 degree to approximately 25 degrees, or 0 degree to approximately 30 degrees.

In some embodiments, an apex of the first branch BC1 and an apex of the third branch BC3 are substantially aligned along the extension direction of the plurality of second mesh blocks MB2 in a respective one of the plurality of second mesh electrode TE2, e.g., the column direction CD in FIG. 1A. In some embodiments, an apex of the second branch BC2 and an apex of the fourth branch BC4 are substantially aligned along the extension direction of the plurality of second mesh blocks MB2 in a respective one of the plurality of second mesh electrode TE2, e.g., the column direction CD in FIG. 1A.

Optionally, the respective second mesh block RMB2 further includes a plurality of first extensions ET1 respectively extending away from the first branch BC1. Optionally, the respective second mesh block RMB2 further includes a plurality of second extensions ET2 respectively extending away from the second branch BC2. Optionally, the respective second mesh block RMB2 further includes a plurality of third extensions ET3 respectively extending away from the third branch BC3. Optionally, the respective second mesh block RMB2 further includes a plurality of fourth extensions ET4 respectively extending away from the fourth branch BC4. In one example illustrated in FIG. 1A and FIG. 3, the respective second mesh block RMB2 further includes a plurality of first extensions ET1 respectively extending away from the first branch BC1, a plurality of second extensions ET2 respectively extending away from the second branch BC2, a plurality of third extensions ET3 respectively extending away from the third branch BC3, a plurality of fourth extensions ET4 respectively extending away from the fourth branch BC4.

Optionally, the first branch BC1 and the second branch BC2 have a substantially mirror symmetry with respect to a plane perpendicular to a main surface of the touch control structure and intersecting connecting portions respectively from the plurality of second mesh blocks MB2 in the respective one of the plurality of second mesh electrodes TE2. Optionally, the third branch BC3 and the fourth branch BC4 have a substantially mirror symmetry with respect to the plane perpendicular to a main surface of the touch control structure and intersecting connecting portions respectively from the plurality of second mesh blocks MB2 in the respective one of the plurality of second mesh electrodes TE2. Optionally, the first branch BC1, the second branch BC2, the third branch BC3, the fourth branch BC4 have a substantially mirror symmetry with respect to the plane perpendicular to a main surface of the touch control structure and intersecting connecting portions respectively from the plurality of second mesh blocks MB2 in the respective one of the plurality of second mesh electrodes TE2. Optionally, the first branch BC1, the second branch BC2, the third branch BC3, the fourth branch BC4, the plurality of first extensions ET1, the plurality of second extensions ET2, the plurality of third extensions ET3, and the plurality of fourth extensions ET4 have a substantially mirror symmetry with respect to the plane perpendicular to a main surface of the touch control structure and intersecting connecting portions respectively from the plurality of second mesh blocks MB2 in the respective one of the plurality of second mesh electrodes TE2. Optionally, the respective second mesh block RMB2 has a substantially mirror symmetry with respect to the plane perpendicular to a main surface of the touch control structure and intersecting connecting portions respectively from the plurality of second mesh blocks MB2 in the respective one of the plurality of second mesh electrodes TE2.

In some embodiments, a respective branch of the respective second mesh block RMB2 includes one or more dummy electrodes completely surrounded by touch detecting mesh lines. Optionally, the first branch BC1 includes a first dummy electrode DE1, the second branch BC2 includes a second dummy electrode DE2, the third branch BC3 includes a third dummy electrode DE3, and the fourth branch BC4 includes a fourth dummy electrode DE4. The first dummy electrode DE1 is completely surrounded by touch detecting mesh lines of the first branch BC1. The second dummy electrode DE2 is completely surrounded by touch detecting mesh lines of the second branch BC2. The third dummy electrode DE3 is completely surrounded by touch detecting mesh lines of the third branch BC3. The fourth dummy electrode DE4 is completely surrounded by touch detecting mesh lines of the fourth branch BC4. Optionally, each of the first dummy electrode DE1, the second dummy electrode DE2, the third dummy electrode DE3, and the fourth dummy electrode DE4 has a substantially V shape. Optionally, apexes of the first dummy electrode DE1 and the second dummy electrode DE2 point toward the first direction DR1. Optionally, apexes of the third dummy electrode DE3 and the fourth dummy electrode DE4 point toward the second direction DR2.

Figure 4:
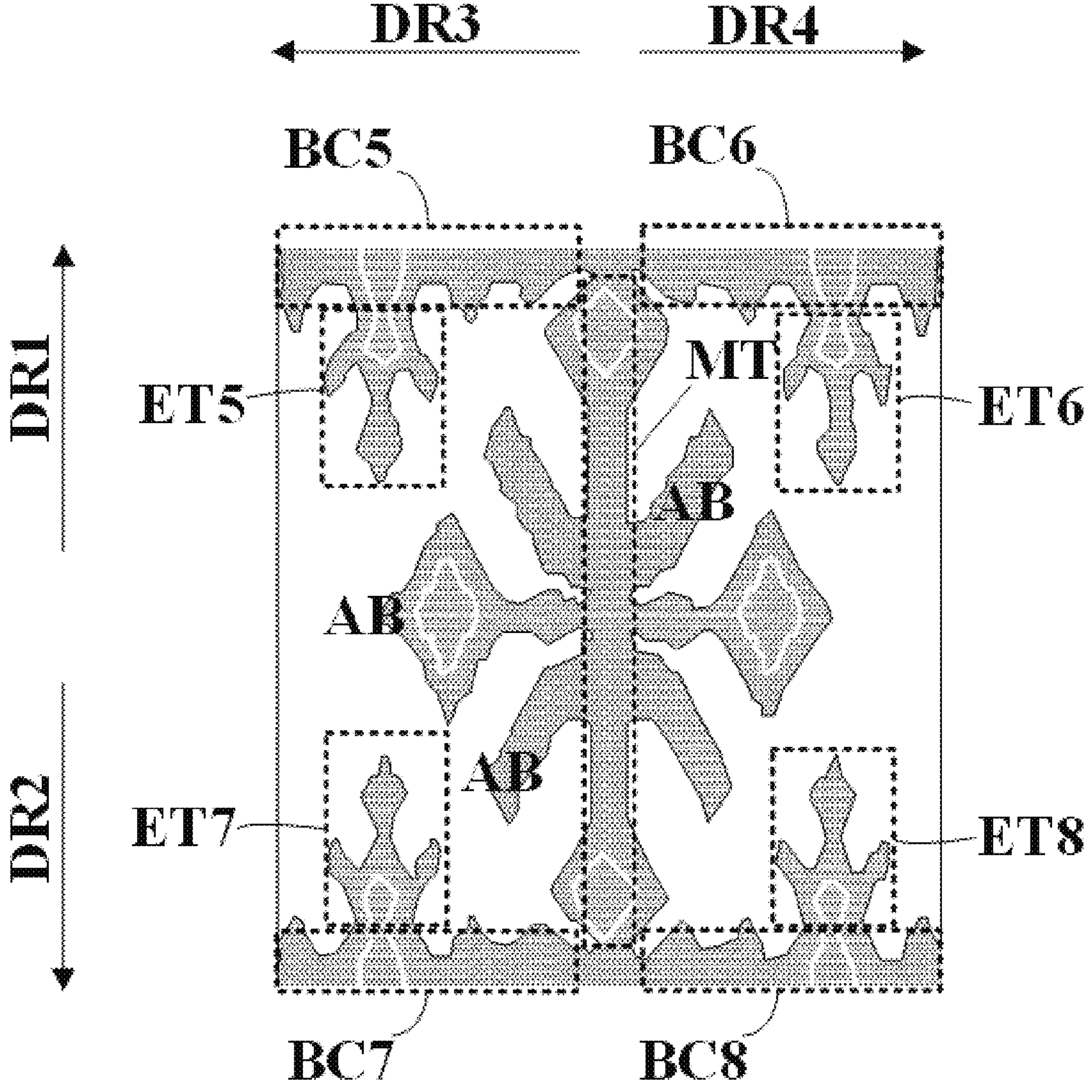
FIG. 4 is a schematic diagram illustrating the structure of a respective first mesh block of a plurality of first mesh blocks in a touch control structure in some embodiments according to the present disclosure.

FIG. 4 is a schematic diagram illustrating the structure of a respective first mesh block of a plurality of first mesh blocks in a touch control structure in some embodiments according to the present disclosure. Referring to FIG. 4, a respective first mesh block RMB1 of the plurality of first mesh blocks MB1 in some embodiments includes a main trunk MT, a fifth branch BC5, a sixth branch BC6, a seventh branch BC7, and an eighth branch BC8, the fifth branch BC5, the sixth branch BC6, the seventh branch BC7, and the eighth branch BC8 respectively connected to the main trunk MT. Optionally, the respective first mesh block RMB1 further includes a plurality of additional branches AB respectively connected to the main trunk MT. In one example, the fifth branch BC5 and the seventh branch BC7 respectively extend away from the main trunk MT along a third direction DR3. In another example, the sixth branch BC6 and the eighth branch BC8 respectively extend away from the main trunk MT along a fourth direction DR4 opposite to the third direction DR3.

Optionally, the third direction DR3 and the fourth direction DR4 are substantially parallel to an extension direction of the plurality of first mesh blocks MB1 and the plurality of third mesh blocks MB3 in a respective one of the plurality of first mesh electrode TE1, e.g., the row direction RD in FIG. 1A. Optionally, the third direction DR3 and the fourth direction DR4 are substantially perpendicular to an extension direction of the main trunk MT. As used herein, the term "substantially perpendicular" means that an angle between two directions is in the range of 45 degree to approximately 90 degrees, e.g., 85 degree to approximately 90 degrees, 80 degree to approximately 90 degrees, 75 degree to approximately 90 degrees, 70 degree to approximately 90 degrees, 65 degree to approximately 90 degrees, or 60 degree to approximately 90 degrees.

Optionally, the respective first mesh block RMB1 further includes a fifth extension ET5 extending away from the fifth branch BC5. Optionally, the respective first mesh block RMB1 further includes a sixth extension ET6 extending away from the sixth branch BC6. Optionally, the respective first mesh block RMB1 further includes a seventh extension ET7 extending away from the seventh branch BC7. Optionally, the respective first mesh block RMB1 further includes an eighth extension ET8 extending away from the eighth branch BC8. Optionally, as shown in FIG. 4, the respective first mesh block RMB1 further includes a fifth extension ET5 extending away from the fifth branch BC5, a sixth extension ET6 extending away from the sixth branch BC6, a seventh extension ET7 extending away from the seventh branch BC7, and an eighth extension ET8 extending away from the eighth branch BC8.

Optionally, the fifth extension ET5 extends away from the fifth branch BC5 along a second direction DR2. Optionally, the sixth extension ET6 extends away from the sixth branch BC6 along the second direction DR2. Optionally, the seventh extension ET7 extends away from the seventh branch BC7 along a first direction DR1. Optionally, the eighth extension ET8 extends away from the eighth branch BC8 along the first direction DR1.

Optionally, the first direction DR1 and the second direction DR2 are substantially parallel to an extension direction of the plurality of second mesh blocks MB2 in a respective one of the plurality of second mesh electrode TE2, e.g., the column direction CD in FIG. 1A. Optionally, the first direction DR1 and the second direction DR2 are substantially parallel to an extension direction of the main trunk MT.

Optionally, the fifth branch BC5 and a sixth branch BC6 have a substantially mirror symmetry with respect to a plane perpendicular to a main surface of the touch control structure and intersecting main bodies respectively from first mesh blocks arranged in a same column and respectively of the plurality of first mesh electrodes TE1. Optionally, the seventh branch BC7 and the eighth branch BC8 have a substantially mirror symmetry with respect to the plane perpendicular to the main surface of the touch control structure and intersecting main bodies respectively from first mesh blocks arranged in a same column and respectively of the plurality of first mesh electrodes TE1. Optionally, the fifth branch BC5, the sixth branch BC6, the seventh branch BC7, and the eighth branch BC8 have a substantially mirror symmetry with respect to the plane perpendicular to a main surface of the touch control structure and intersecting main bodies respectively from first mesh blocks arranged in a same column and respectively of the plurality of first mesh electrodes TE1. Optionally, the fifth branch BC5, the sixth branch BC6, the seventh branch BC7, the eighth branch BC8, the fifth extension ET5, the sixth extension ET6, the seventh extension ET7, and the eighth extension ET8 have a substantially mirror symmetry with respect to the plane perpendicular to a main surface of the touch control structure and intersecting main bodies respectively from first mesh blocks arranged in a same column and respectively of the plurality of first mesh electrodes TE1. Optionally, the respective first mesh block RMB1 has a substantially mirror symmetry with respect to the plane perpendicular to a main surface of the touch control structure and intersecting main bodies respectively from first mesh blocks arranged in a same column and respectively of the plurality of first mesh electrodes TE1.

In some embodiments, a respective branch of the respective first mesh block RMB1 includes one or more dummy electrodes completely surrounded by touch detecting mesh lines of the respective first mesh block RMB1. As shown in FIG. 4, in one example, the fifth branch BC5, the sixth branch BC6, the seventh branch BC7, the eighth branch BC8, and at least one of the plurality of additional branches AB respectively include a dummy electrode.

Figure 5:
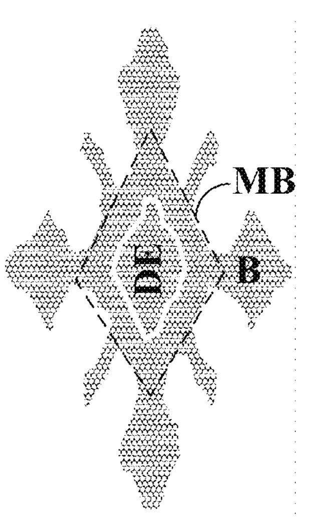
FIG. 5 is a schematic diagram illustrating the structure of a respective third mesh block of a plurality of third mesh blocks in a touch control structure in some embodiments according to the present disclosure.

FIG. 5 is a schematic diagram illustrating the structure of a respective third mesh block of a plurality of third mesh blocks in a touch control structure in some embodiments according to the present disclosure. Referring to FIG. 5, a respective third mesh block RMB3 of the plurality of third mesh blocks MB3 in some embodiments includes a main body MB, a plurality of branches B protruding away from the main body MB. The main body MB optionally includes a dummy electrode DE completely surrounded by touch detecting mesh lines of the main body MB.

Referring to FIG. 1A and FIG. 3, in some embodiments, the respective third mesh block RMB3 of the plurality of third mesh blocks is in a space between the third branch BC3 and the fourth branch BC4 of a first adjacent second mesh block AMB2-1, the first branch BC1 and the second branch BC2 of a second adjacent second mesh block AMB2-2, the first conductive bridge B1 in the first adjacent column AC1, and the second conductive bridge B2 in the first adjacent column AC1. The first adjacent second mesh block AMB2-1 and the second adjacent second mesh block AMB2-2 are in the first adjacent column AC1. The first conductive bridge B1 in the first adjacent column AC1 connects the third branch BC3 of the first adjacent second mesh block AMB2-1 and the first branch BC1 of the second adjacent second mesh block AMB2-2. The second conductive bridge B2 in the first adjacent column AC1 connects the fourth branch BC4 of the first adjacent second mesh block AMB2-1 and the second branch BC2 of the second adjacent second mesh block AMB2-2.

In one example as depicted in FIG. 1A, the respective third mesh block RMB3 of the plurality of third mesh blocks MB3 is surrounded by the third branch BC3 and the fourth branch BC4 of a first adjacent second mesh block AMB2-1, the first branch BC1 and the second branch BC2 of a second adjacent second mesh block AMB2-2, the first conductive bridge B1 in the first adjacent column AC1, and the second conductive bridge B2 in the first adjacent column AC1. The respective third mesh block RMB3 of the plurality of third mesh blocks MB3 is in a remaining space formed by the third branch BC3 and the fourth branch BC4 of a first adjacent second mesh block AMB2-1, the first branch BC1 and the second branch BC2 of a second adjacent second mesh block AMB2-2, the first conductive bridge B1 in the first adjacent column AC1, and the second conductive bridge B2 in the first adjacent column AC1, except for the space occupied by dummy electrodes between the respective third mesh block RMB3 and adjacent touch detecting mesh blocks.

In some embodiments, a first portion (e.g., an upper portion of the respective third mesh block RMB3 in FIG. 1A) of the respective third mesh block RMB3 extends into a space between the third branch BC3 and the fourth branch BC4 of a first adjacent second mesh block AMB2-1; and a second portion (e.g., a lower portion of the respective third mesh block RMB3 in FIG. 1A) of the respective third mesh block RMB3 extends into a space between the first branch BC1 and the second branch BC2 of a second adjacent second mesh block AMB2-2.

In some embodiments, the respective first mesh block RMB1 of the plurality of first mesh blocks is in a space between the third branch BC3 of a first adjacent second mesh block AMB2-1, the first branch BC1 of a second adjacent second mesh block AMB2-2, the fourth branch BC4 of a third adjacent second mesh block AMB2-3, the second branch BC2 of a fourth adjacent second mesh block AMB2-4, the fourth conductive bridge B4 in the second adjacent column AC2, and the first conductive bridge B1 in the first adjacent column AC1. The first adjacent second mesh block AMB2-1 and the second adjacent second mesh block AMB2-2 are in the first adjacent column AC1. The third adjacent second mesh block AMB2-3 and the fourth adjacent second mesh block AMB2-4 are in the second adjacent column AC2. The first conductive bridge B1 in the first adjacent column AC1 connects the third branch BC3 of the first adjacent second mesh block AMB2-1 and the first branch BC1 of the second adjacent second mesh block AMB2-2. The fourth conductive bridge B4 in the second adjacent column AC2 connects the fourth branch BC4 of the third adjacent second mesh block AMB2-3 and the second branch BC2 of the fourth adjacent second mesh block AMB2-4.

In one example as depicted in FIG. 1A, the respective first mesh block RMB1 of the plurality of first mesh blocks MB1 is surrounded by two adjacent first mesh blocks in a same column and respectively of adjacent first mesh electrodes TE1, the third branch BC3 of a first adjacent second mesh block AMB2-1, the first branch BC1 of a second adjacent second mesh block AMB2-2, the fourth branch BC4 of a third adjacent second mesh block AMB2-3, the second branch BC2 of a fourth adjacent second mesh block AMB2-4, the fourth conductive bridge B4 in the second adjacent column AC2, and the first conductive bridge B1 in the first adjacent column AC1. The respective first mesh block RMB1 of the plurality of first mesh blocks MB1 is in a remaining space formed by two adjacent first mesh blocks in a same column and respectively of adjacent first mesh electrodes TE1, the third branch BC3 of a first adjacent second mesh block AMB2-1, the first branch BC1 of a second adjacent second mesh block AMB2-2, the fourth branch BC4 of a third adjacent second mesh block AMB2-3, the second branch BC2 of a fourth adjacent second mesh block AMB2-4, the fourth conductive bridge B4 in the second adjacent column AC2, and the first conductive bridge B1 in the first adjacent column AC1, except for the space occupied by dummy electrodes between the respective first mesh block RMB1 and adjacent touch detecting mesh blocks.

In some embodiments, a first portion (e.g., an upper portion of the respective first mesh block RMB1 in FIG. 1A) of the respective first mesh block RMB1 extends into a space between the third branch BC3 of the first adjacent second mesh block AMB2-1 and the fourth branch BC4 of the third adjacent second mesh block AMB2-3; and a second portion (e.g., a lower portion of the respective first mesh block RMB1 in FIG. 1A) of the respective first mesh block RMB1 extends into a space between the first branch BC1 of the second adjacent second mesh block AMB2-2 and the second branch BC2 of the fourth adjacent second mesh block AMB2-4.

Figure 1B:
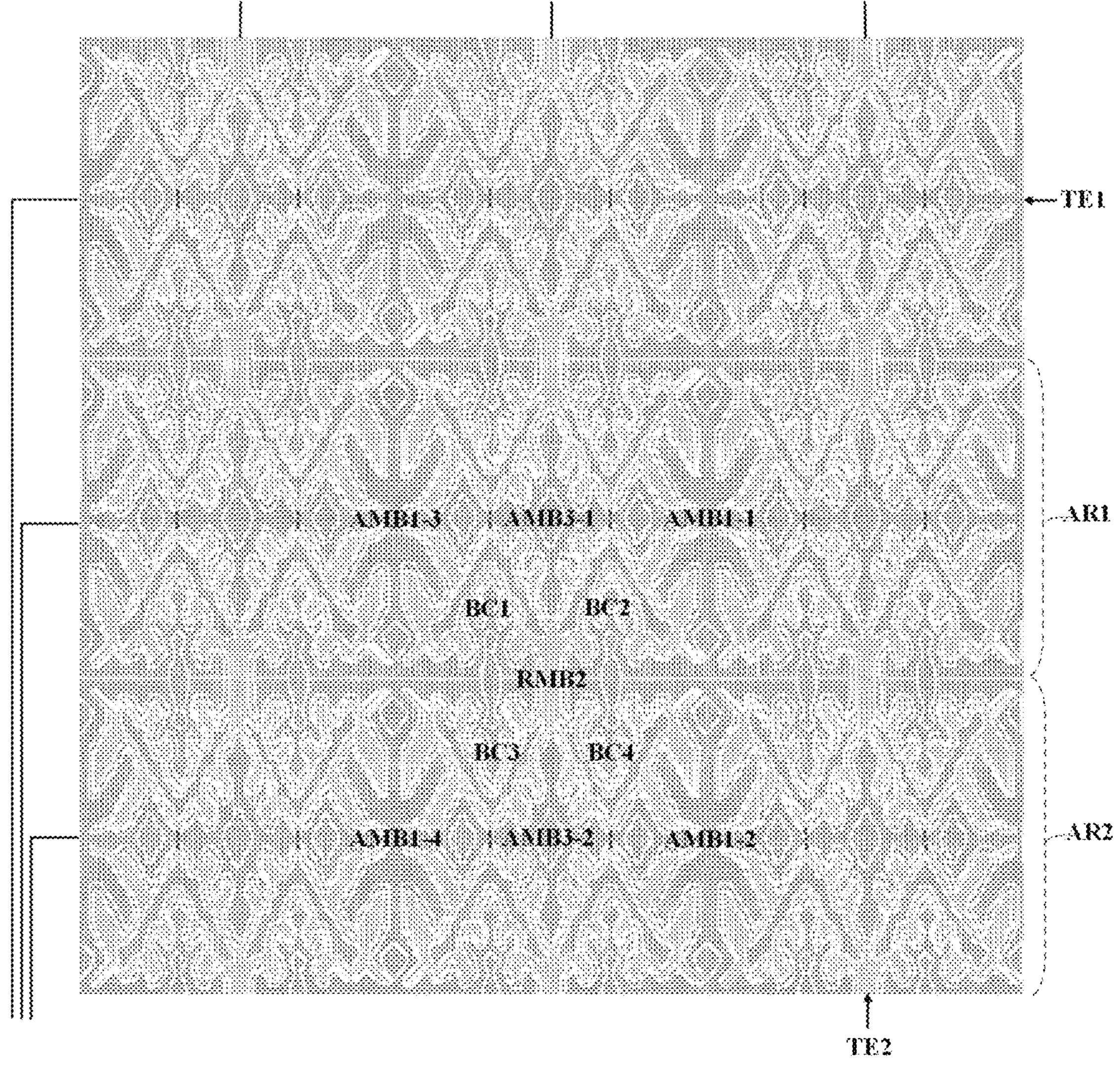
FIG. 1B is a schematic diagram illustrating the structure of a touch control structure in some embodiments according to the present disclosure.

FIG. 1B is a schematic diagram illustrating the structure of a touch control structure in some embodiments according to the present disclosure. Referring to FIG. 1B, in some embodiments, the respective second mesh block RMB2 is in a space between a first adjacent third mesh block AMB3-1, a second adjacent third mesh block AMB3-2, a first adjacent first mesh block AMB1-1, a second adjacent first mesh block AMB1-2, a third adjacent first mesh block AMB1-3, and a fourth adjacent first mesh block AMB1-4. The third adjacent first mesh block AMB1-3, the first adjacent third mesh block AMB3-1, and the first adjacent first mesh block AMB1-1 are consecutively in a first adjacent row. The fourth adjacent first mesh block AMB1-4, the second adjacent third mesh block AMB3-2, and the second adjacent first mesh block AMB1-2 are consecutively in a second adjacent row.

In some embodiments, referring to FIG. 1B, FIG. 3, FIG. 4, and FIG. 5, a portion the first adjacent third mesh block AMB3-1 extends into a space between the first branch BC1 and the second branch BC2 of the respective second mesh block RMB2. Specifically, multiple branches of the first adjacent third mesh block AMB3-1 respectively extend into respective spaces respectively between adjacent first extensions of the plurality of first extensions ET1, or respective spaces respectively between adjacent second extensions of the plurality of second extensions ET2, or a space between a first extension and a second extension adjacent to each other.

Referring to FIG. 1B, FIG. 3, FIG. 4, and FIG. 5, a portion of the second adjacent third mesh block AMB3-2 extends into a space between the third branch BC3 and the fourth branch BC4 of the respective second mesh block RMB2. Specifically, multiple branches of the second adjacent third mesh block AMB3-2 respectively extend into respective spaces respectively between adjacent third extensions of the plurality of third extensions ET3, or respective spaces respectively between adjacent fourth extensions of the plurality of fourth extensions ET4, or a space between a third extension and a fourth extension adjacent to each other.

Referring to FIG. 1B, FIG. 3, FIG. 4, and FIG. 5, a portion of the first adjacent first mesh block AMB1-1 and a portion of the second adjacent first mesh block AMB1-2 respectively extend into a space between the second branch BC2 and the fourth branch BC4 of the respective second mesh block RMB2. Specifically, the seventh branch BC7 and the seventh extension ET7 of the first adjacent first mesh block AMB1-1, and the fifth branch BC5 and the fifth extension ET5 of the second adjacent first mesh block AMB1-2, together extend into the space between the second branch BC2 and the fourth branch BC4 of the respective second mesh block RMB2. Moreover, the seventh extension ET7 of the first adjacent first mesh block AMB1-1 extends into respective spaces respectively between respective adjacent second extensions of the plurality of second extensions ET2 of the respective second mesh block RMB2; and the fifth extension ET5 of the second adjacent first mesh block AMB1-2 extends into respective spaces respectively between respective adjacent fourth extensions of the plurality of fourth extensions ET4 of the respective second mesh block RMB2.

Referring to FIG. 1B, FIG. 3, FIG. 4, and FIG. 5, a portion of the third adjacent first mesh block AMB1-3 and a portion of the fourth adjacent first mesh block AMB1-4 respectively extend into a space between the first branch BC1 and the third branch BC3 of the respective second mesh block RMB2. Specifically, the eighth branch BC8 and the eighth extension ET8 of the third adjacent first mesh block AMB1-3, and the sixth branch BC6 and the sixth extension ET6 of the fourth adjacent first mesh block AMB1-4, together extend into the space between the first branch BC1 and the third branch BC3 of the respective second mesh block RMB2. Moreover, the eighth extension ET8 of the third adjacent first mesh block AMB1-3 extends into respective spaces respectively between respective adjacent first extensions of the plurality of first extensions ET1 of the respective second mesh block RMB2; and the sixth extension ET6 of the fourth adjacent first mesh block AMB1-4 extends into respective spaces respectively between respective adjacent third extensions of the plurality of third extensions ET3 of the respective second mesh block RMB2.

Referring to FIG. 1B, FIG. 3, FIG. 4, and FIG. 5, in some embodiments, a respective one of the plurality of first extensions ET1 extends into a space between two adjacent branches of the third adjacent first mesh block AMB1-3 or a space between two adjacent branches of the first adjacent third mesh block AMB3-1. A respective one of the plurality of second extensions ET2 extends into a space between two adjacent branches of the first adjacent first mesh block AMB1-1 or a space between two adjacent branches of the first adjacent third mesh block AMB3-1. A respective one of the plurality of third extensions ET3 extends into a space between two adjacent branches of the fourth adjacent first mesh block AMB1-4 or a space between two adjacent branches of the second adjacent third mesh block AMB3-2. A respective one of the plurality of fourth extensions ET4 extends into a space between branches of the second adjacent first mesh block AMB1-2 or a space between branches of the second adjacent third mesh block AMB3-2.

In some embodiments, extensions of branches respectively from the third adjacent first mesh block AMB1-3 and the fourth adjacent first mesh block AMB1-4 respectively extend into a space surrounded by the connecting portion CP, the plurality of first extensions ET1, and the plurality of third extensions ET3, a respective extension intercalating into a space between two adjacent first extensions or a space between two adjacent third extensions. Extensions of branches respectively from the first adjacent first mesh block AMB1-1 and the second adjacent first mesh block AMB1-2 respectively extend into a space surrounded by the connecting portion CP, the plurality of second extensions ET2, and the plurality of fourth extensions ET4, a respective extension intercalating into a space between two adjacent second extensions or a space between two adjacent fourth extensions.

Figure 6:
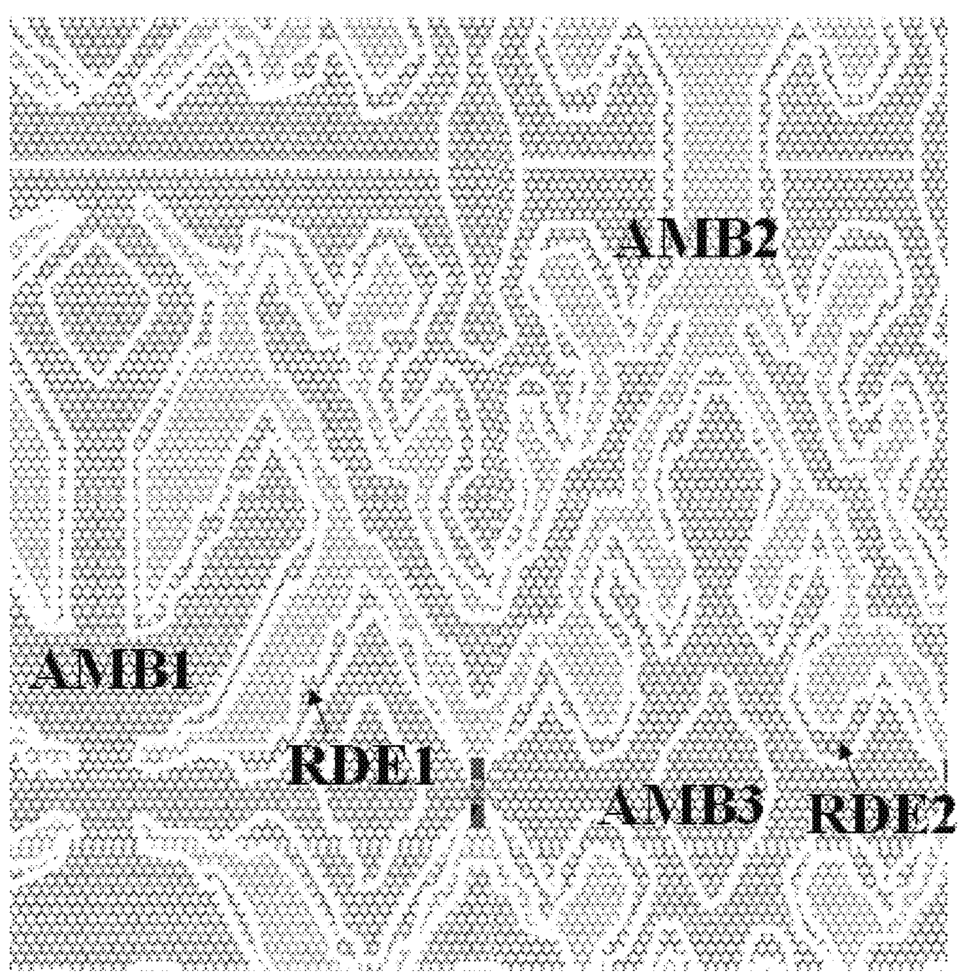
FIG. 6 is a zoom-in view of a touch control structure in a region having a first mesh block, a second mesh block, and a third mesh block adjacent to each other.

In some embodiments, the touch control structure further includes dummy electrodes respectively between adjacent mesh blocks. FIG. 6 is a zoom-in view of a touch control structure in a region having a first mesh block, a second mesh block, and a third mesh block adjacent to each other. Referring to FIG. 6, in some embodiments, the touch control structure further includes a first respective dummy electrode RDE1 in a space between second mesh block AMB2 and first mesh block AMB1 adjacent to each other, the first respective dummy electrode RDE1 insulated from the second mesh block AMB2 and first mesh block AMB1 adjacent to each other. The touch control structure further includes a second respective dummy electrode RDE2 in a space between second mesh block AMB2 and third mesh block AMB3 adjacent to each other, the second respective dummy electrode RDE2 insulated from the second mesh block AMB2 and third mesh block AMB3 adjacent to each other.

Figure 7A:
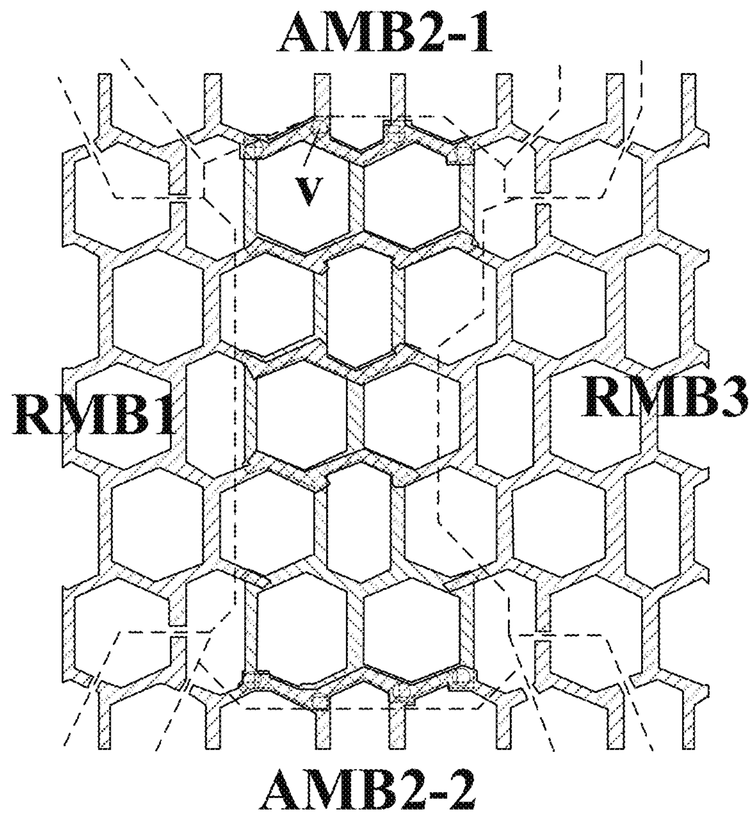
FIG. 7A is a zoom-in view of a region surrounding a respective conductive bridge in some embodiments according to the present disclosure.
Figure 7B:
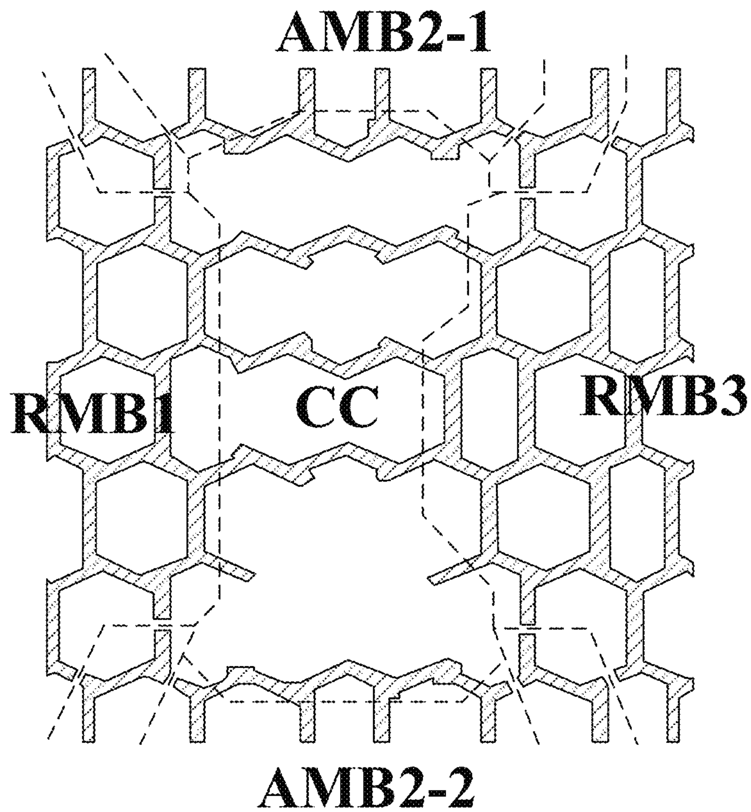
FIG. 7B illustrates the structure of a second metal layer in a region surrounding a respective conductive bridge in some embodiments according to the present disclosure.
Figure 7C:
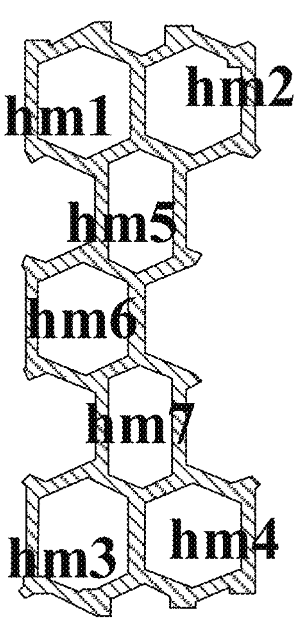
FIG. 7C illustrates the structure of a first metal layer in a region surrounding a respective conductive bridge in some embodiments according to the present disclosure.

FIG. 7A is a zoom-in view of a region surrounding a respective conductive bridge in some embodiments according to the present disclosure. FIG. 7B illustrates the structure of a second metal layer in a region surrounding a respective conductive bridge in some embodiments according to the present disclosure. FIG. 7C illustrates the structure of a first metal layer in a region surrounding a respective conductive bridge in some embodiments according to the present disclosure. Referring to FIG. 2, FIG. 7A to FIG. 7C, in some embodiments, the respective conductive bridge of the plurality of conductive bridges CB is respectively electrically connected to two adjacent second mesh blocks respectively through vias v extending through the touch insulating layer TI. An orthographic projection on a base substrate (e.g., the buffer layer BUF) of any mesh line of the respective conductive bridge along a direction from a first adjacent second mesh block AMB2-1 to a second adjacent second mesh block AMB2-2 is at least partially non-overlapping with orthographic projections of mesh lines of the plurality of first mesh electrodes (e.g., the respective first mesh block RMB1 and the respective third mesh block RMB3) on the base substrate. An orthographic projection on the base substrate of at least one mesh line of the respective conductive bridge along a direction other than the direction from the first adjacent second mesh block AMB2-1 to the second adjacent second mesh block AMB2-2 overlaps with an orthographic projection of a mesh line of a conductive channel CC connecting respective adjacent pairs of first mesh block and third mesh block on the base substrate.

In some embodiments, the respective conductive bridge includes a plurality of hexagonal meshes connected together. In one example, the respective conductive bridge includes a first hexagonal mesh hm1 and a second hexagonal mesh hm2, the first adjacent second mesh block AMB2-1 connected to the first hexagonal mesh hm1 and the second hexagonal mesh hm2 respectively through vias extending through the touch insulating layer. The respective conductive bridge further includes a third hexagonal mesh hm3 and a fourth hexagonal mesh hm4, the second adjacent second mesh block AMB2-2 connected to the third hexagonal mesh hm3 and the fourth hexagonal mesh hm4 respectively through vias extending through the touch insulating layer. The respective conductive bridge further includes a fifth hexagonal mesh hm5, a sixth hexagonal mesh hm6, and a seventh hexagonal mesh hm7 consecutively arranged between the first hexagonal mesh hm1 (or the second hexagonal mesh hm2) and the third hexagonal mesh hm3 (or the fourth hexagonal mesh hm4). Specifically, the fifth hexagonal mesh hm5 is connected to the first hexagonal mesh hm1 and the second hexagonal mesh hm2, the seventh hexagonal mesh hm7 is connected to the third hexagonal mesh hm3 and the fourth hexagonal mesh hm4, and the sixth hexagonal mesh hm6 is connected to the fifth hexagonal mesh hm5 on one side and connected to the seventh hexagonal mesh hm7 on another side.

Figure 8:
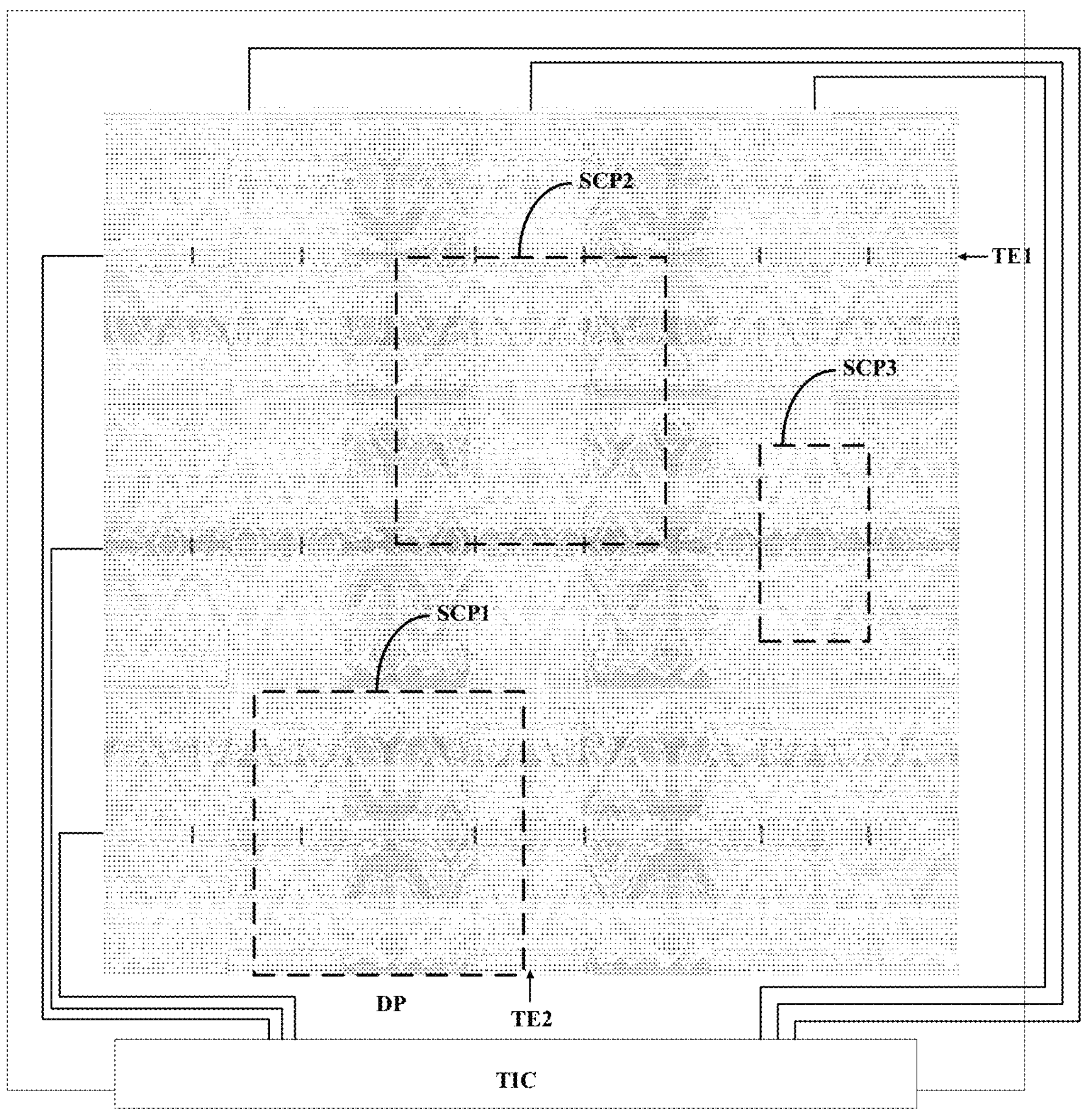
FIG. 8 is a plan view of a display apparatus in some embodiments according to the present disclosure.

In another aspect, the present disclosure provides a display apparatus. In some embodiments, the display apparatus includes a display panel, a touch control structure on the display panel, and a touch control integrated circuit connect to the touch control structure. In some embodiments, the display panel includes a plurality of display elements and a plurality of thin film transistors for driving the plurality of display elements. Optionally, the display elements includes a plurality of light emitting diodes, for example, in an organic light emitting diode display panel. Optionally, the display elements include a liquid crystal layer in a plurality of subpixels, for example, in a liquid crystal display panel. FIG. 8 is a plan view of a display apparatus in some embodiments according to the present disclosure. Referring to FIG. 8, the display apparatus in some embodiments includes the touch control structure described herein or fabricated by a method described herein, a display panel DP, and a touch control integrated circuit TIC connect to the touch control structure. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

Figure 9:
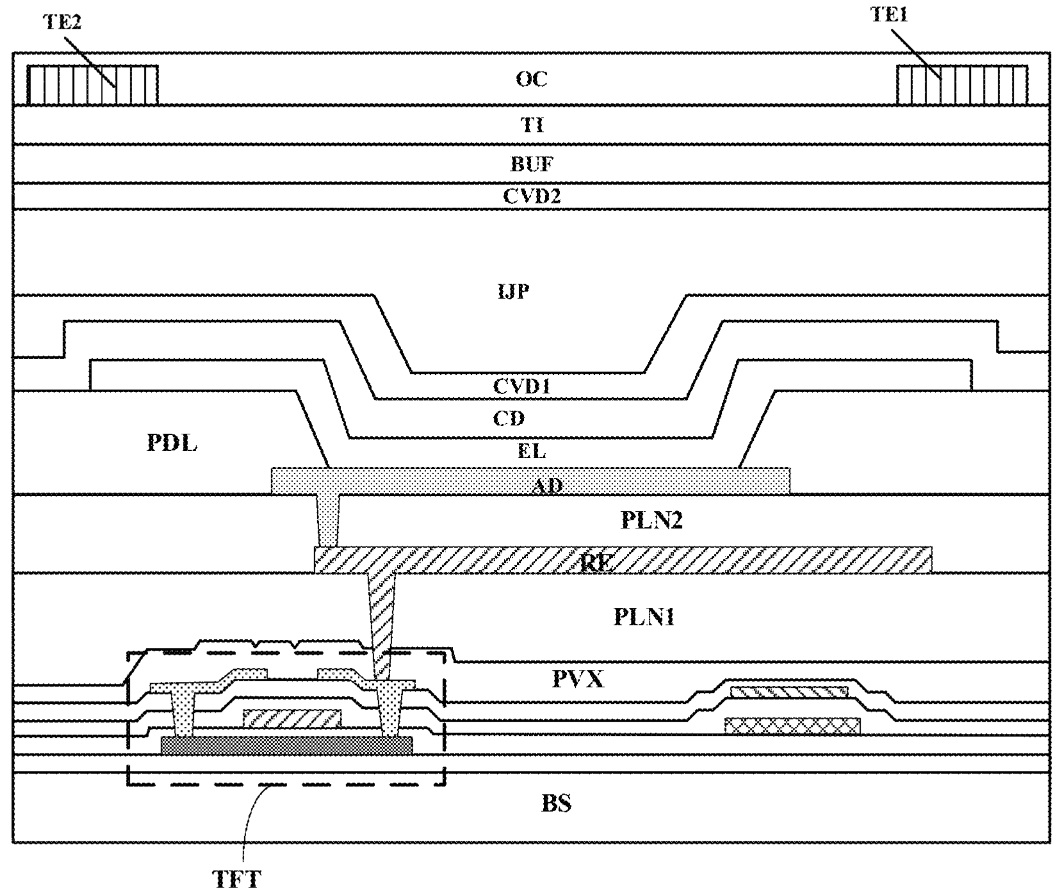
FIG. 9 is a cross sectional view of a display panel in some embodiments according to the present disclosure.

FIG. 9 is a cross sectional view of a display panel in some embodiments according to the present disclosure. Referring to FIG. 9, in the display region, the display panel includes a base substrate BS, a plurality of thin film transistors TFT on the base substrate BS, a passivation layer PVX on a side of the plurality of thin film transistors TFT away from the base substrate BS, a first planarization layer PLN1 on side of the passivation layer PVX away from the base substrate BS, a relay electrode RE on side of the first planarization layer PLN1 away from the passivation layer PVX, a second planarization layer PLN2 on a side of the relay electrode RE away from the first planarization layer PLN1, a pixel definition layer PDL on a side of the second planarization layer PLN2 away from the first planarization layer PLN1 and defining subpixel apertures, an anode layer AD on a side of the second planarization layer PLN2 away from the first planarization layer PLN1, a light emitting layer EL on a side of the anode layer AD away from the second planarization layer PLN2, a cathode layer CD on a side of the light emitting layer EL away from the anode layer AD, a first inorganic encapsulating layer CVD1 on a side of the cathode layer CD away from light emitting layer EL, an organic encapsulating layer IJP on a side of the first inorganic encapsulating layer CVD1 away from the cathode layer CD, a second inorganic encapsulating layer CVD2 on a side of the organic encapsulating layer IJP away from the first inorganic encapsulating layer CVD1, a buffer layer BUF on a side of the second inorganic encapsulating layer CVD2 away from the organic encapsulating layer IJP, a touch insulating layer TI on a side of the buffer layer BUF away from the second inorganic encapsulating layer CVD2, touch electrodes (e.g., the plurality of first touch electrodes TE1 and the plurality of second touch electrodes TE2 as shown in FIG. 1A) on a side of the touch insulating layer TI away from the buffer layer BUF, and an overcoat layer OC on a side of the touch electrodes away from the touch insulating layer TI.

Figure 10:
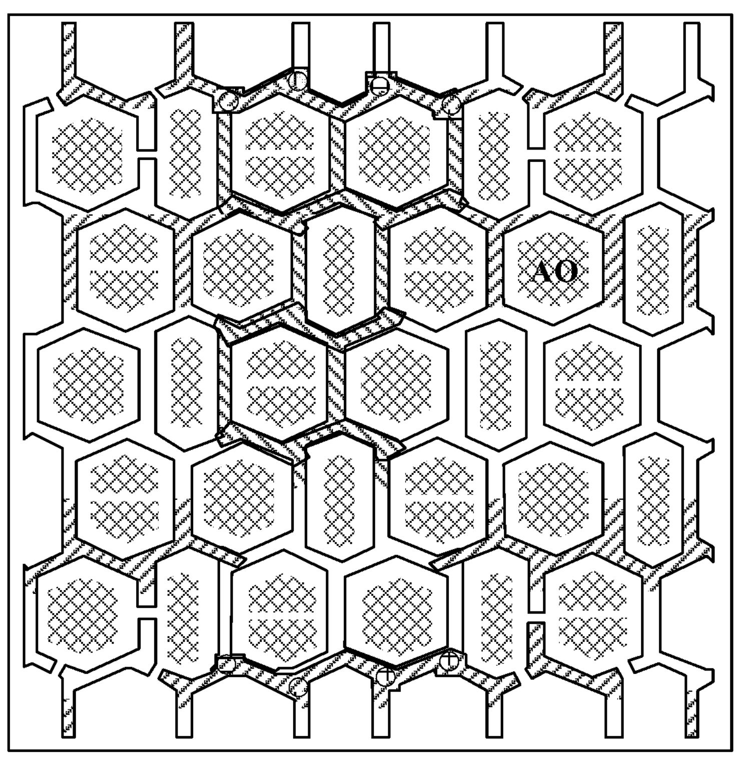
FIG. 10 is a zoom-in view of a region surrounding a respective conductive bridge in a display apparatus in some embodiments according to the present disclosure.

FIG. 10 is a zoom-in view of a region surrounding a respective conductive bridge in a display apparatus in some embodiments according to the present disclosure. Referring to FIG. 10, FIG. 1A, FIG. 2, FIG. 7A to FIG. 7C, and FIG. 9, a respective one of the plurality of second mesh electrodes TE2 includes a plurality of second mesh blocks MB2 and a plurality of conductive bridges CB in a respective column, the plurality of second mesh blocks MB2 are consecutively electrically connected respectively through the plurality of conductive bridges CB. The plurality of first mesh blocks MB1, the plurality of second mesh blocks MB2, and the plurality of third mesh blocks MB3 are on a side of the touch insulating layer TI away from the plurality of conductive bridges CB. A respective conductive bridge of the plurality of conductive bridges CB are respectively electrically connected to two adjacent second mesh blocks respectively through vias extending through the touch insulating layer TI.

In some embodiments, orthographic projections of mesh lines of the touch control structure in the display region on a base substrate BS are non-overlapping with orthographic projections of the plurality of anodes AO on the base substrate BS. An orthographic projection of a mesh of the touch control structure in the display region on the base substrate BS surrounds an orthographic projection of one or two anode of the plurality of anodes AO on the base substrate BS.

In some embodiments, the respective conductive bridge includes a plurality of hexagonal meshes connected together. In one example, the respective conductive bridge includes a first hexagonal mesh hm1 and a second hexagonal mesh hm2, the first adjacent second mesh block AMB2-1 connected to the first hexagonal mesh hm1 and the second hexagonal mesh hm2 respectively through vias extending through the touch insulating layer. The respective conductive bridge further includes a third hexagonal mesh hm3 and a fourth hexagonal mesh hm4, the second adjacent second mesh block AMB2-2 connected to the third hexagonal mesh hm3 and the fourth hexagonal mesh hm4 respectively through vias extending through the touch insulating layer. The respective conductive bridge further includes a fifth hexagonal mesh hm5, a sixth hexagonal mesh hm6, and a seventh hexagonal mesh hm7 consecutively arranged between the first hexagonal mesh hm1 (or the second hexagonal mesh hm2) and the third hexagonal mesh hm3 (or the fourth hexagonal mesh hm4). Specifically, the fifth hexagonal mesh hm5 is connected to the first hexagonal mesh hm1 and the second hexagonal mesh hm2, the seventh hexagonal mesh hm7 is connected to the third hexagonal mesh hm3 and the fourth hexagonal mesh hm4, and the sixth hexagonal mesh hm6 is connected to the fifth hexagonal mesh hm5 on one side and connected to the seventh hexagonal mesh hm7 on another side.

In some embodiments, an orthographic projection of a respective hexagonal mesh on a base substrate BS surrounds an orthographic projection of one or two anodes of the plurality of anodes AO on the base substrate BS.

In the present touch control structure and display apparatus, in at least a portion of the touch control structure having at least four (e.g., at least 8, at least 12, at least 16, at least 20, at least 24, at least 28, at least 32, at least 36, or at least 40) of the plurality of second mesh blocks, inside an area defined by an active pen sensing range with reference to any point in the portion of the touch control structure, an electrode ratio of a first occupied area actually occupied by mesh lines of first mesh electrodes to a second occupied area actually occupied by mesh lines of second mesh electrodes is in a range of 0.8 to 1.2, for example, 0.85 to 1.20, 0.90 to 1.20, 0.95 to 1.20, 1.00 to 1.20, 1.05 to 1.20, 1.10 to 1.20, 1.15 to 1.20, 0.80 to 1.15, 0.80 to 1.10, 0.80 to 1.05, 0.80 to 1.00, 0.80 to 0.95, 0.80 to 0.90, 0.80 to 0.85, 0.85 to 1.15, 0.90 to 1.10, 0.95 to 1.05, or 0.98 to 1.02, or 0.99 to 1.01.

In some embodiments, throughout the touch control structure, inside the area defined by the active pen sensing range with reference to any point in the portion of the touch control structure, the electrode ratio of the first occupied area actually occupied by mesh lines of first mesh electrodes to the second occupied area actually occupied by mesh lines of second mesh electrodes is in a range of 0.8 to 1.2, for example, 0.85 to 1.20, 0.90 to 1.20, 0.95 to 1.20, 1.00 to 1.20, 1.05 to 1.20, 1.10 to 1.20, 1.15 to 1.20, 0.80 to 1.15, 0.80 to 1.10, 0.80 to 1.05, 0.80 to 1.00, 0.80 to 0.95, 0.80 to 0.90, 0.80 to 0.85, 0.85 to 1.15, 0.90 to 1.10, 0.95 to 1.05, 0.98 to 1.02, or 0.99 to 1.01.

Figure 11:
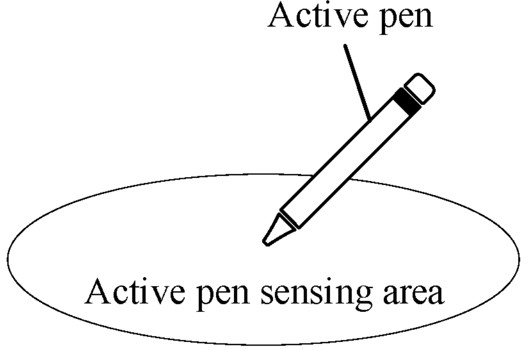
FIG. 11 illustrates an active pen sensing area in some embodiments according to the present disclosure.

In some embodiments, the active pen sensing range is a sensing range of an active pen for performing a touch control in the present touch control structure or display apparatus. In one example, the active pen sensing range area is a sensing range area of an active pen comprising a tip having a diameter in a range of 0.8 mm to 2.0 mm, e.g., 0.8 mm to 0.9 mm, 0.9 mm to 1.0 mm, 1.0 mm to 1.1 mm, 1.1 mm to 1.2 mm, 1.2 mm to 1.3 mm, 1.3 mm to 1.4 mm, 1.4 mm to 1.5 mm, 1.5 mm to 1.6 mm, 1.6 mm to 1.7 mm, 1.7 mm to 1.8 mm, 1.8 mm to 1.9 mm, or 1.9 mm to 2.0 mm. FIG. 11 illustrates an active pen sensing area in some embodiments according to the present disclosure.

In some embodiments, the active pen sensing range has a size between ¼ and ⅓ of a size of an area of a smallest convex polygon that encircles a respective second mesh block of the plurality of second mesh blocks. FIG. 8 depicts an example of the smallest convex polygon SCP2 that encircles a respective second mesh block of the plurality of second mesh blocks. As discussed above, in one example, the respective second mesh block has a substantially ∞ shape. Optionally, the smallest convex polygon SCP2 has a rectangular shape as depicted in FIG. 8.

Optionally, the smallest convex polygon is a smallest convex polygon having four sides. Optionally, the smallest convex polygon is a smallest convex polygon having three sides. Optionally, the smallest convex polygon is a smallest convex polygon having five sides. Optionally, the smallest convex polygon is a smallest convex polygon having six sides. Optionally, the smallest convex polygon is a smallest convex regular polygon.

In some embodiments, the active pen sensing range has a convex polygon shape or a circular shape or an elliptical shape.

In some embodiments, the electrode ratio in the smallest convex polygon is in a range of 0.8 to 1.2, for example, 0.85 to 1.20, 0.90 to 1.20, 0.95 to 1.20, 1.00 to 1.20, 1.05 to 1.20, 1.10 to 1.20, 1.15 to 1.20, 0.80 to 1.15, 0.80 to 1.10, 0.80 to 1.05, 0.80 to 1.00, 0.80 to 0.95, 0.80 to 0.90, 0.80 to 0.85, 0.85 to 1.15, 0.90 to 1.10, 0.95 to 1.05, 0.98 to 1.02, or 0.99 to 1.01.

In some embodiments, inside any area having a size between ¼ and ⅓ (e.g., between 1/40 and 1/3.8, between 1/3.8 and 1/3.6, between 1/3.6 and 1/3.4, between 1/3.4 and 1/3.2, or between 1/3.2 and 1/3.0) of the size of the area of the smallest convex polygon, with reference to any point in the portion of the touch control structure, an electrode ratio is in a range of 0.8 to 1.2. Optionally, inside any area having a convex polygon shape and a size between ¼ and ⅓ (e.g., between 1/4.0 and 1/3.8, between 1/3.8 and 1/3.6, between 1/3.6 and 1/3.4, between 1/3.4 and 1/3.2, or between 1/3.2 and 1/3.0) of the size of the area of the smallest convex polygon, with reference to any point in the portion of the touch control structure, an electrode ratio is in a range of 0.8 to 1.2.

In some embodiments, inside any area having a size between ⅕ and ¼ (e.g., between 1/5.0 and 1/4.8, between 1/4.8 and 1/4.6, between 1/4.6 and 1/4.4, between 1/4.4 and 1/4.2, or between 1/4.2 and 1/4.0) of the size of the area of the smallest convex polygon, with reference to any point in the portion of the touch control structure, an electrode ratio is in a range of 0.8 to 1.2. Optionally, inside any area having a convex polygon shape and a size between ⅕ and ¼ (e.g., between 1/5.0 and 1/4.8, between 1/4.8 and 1/4.6, between 1/4.6 and 1/4.4, between 1/4.4 and 1/4.2, or between 1/4.2 and 1/4.0) of the size of the area of the smallest convex polygon, with reference to any point in the portion of the touch control structure, an electrode ratio is in a range of 0.8 to 1.2.

In some embodiments, inside any area having a size between ⅙ and ⅕ (e.g., between 1/6.0 and 1/5.8, between 1/5.8 and 1/5.6, between 1/5.6 and 1/5.4, between 1/5.4 and 1/5.2, or between 1/5.2 and 1/5.0) of the size of the area of the smallest convex polygon, with reference to any point in the portion of the touch control structure, an electrode ratio is in a range of 0.8 to 1.2. Optionally, inside any area having a convex polygon shape and a size between ⅙ and ⅕ (e.g., between 1/6.0 and 1/5.8, between 1/5.8 and 1/5.6, between 1/5.6 and 1/5.4, between 1/5.4 and 1/5.2, or between 1/5.2 and 1/5.0) of the size of the area of the smallest convex polygon, with reference to any point in the portion of the touch control structure, an electrode ratio is in a range of 0.8 to 1.2.

In some embodiments, inside any area having a size between 1/20 and ⅙ (e.g., between 1/20 and 1/19, between 1/19 and 1/18, between 1/18 and 1/17, between 1/17 and 1/16, between 1/16 and 1/15, between 1/15 and 1/14, between 1/14 and 1/13, between 1/13 and 1/12, between 1/12 and 1/11, between 1/11 and 1/10, between 1/10 and 1/9, between 1/9 and ⅛, between ⅛ and 1/7, or between 1/7 and ⅙) of the size of the area of the smallest convex polygon, with reference to any point in the portion of the touch control structure, an electrode ratio is in a range of 0.8 to 1.2. Optionally, inside any area having a convex polygon shape and a size between 1/20 and ⅙ (e.g., between 1/20 and 1/19, between 1/19 and 1/18, between 1/18 and 1/17, between 1/17 and 1/16, between 1/16 and 1/15, between 1/15 and 1/14, between 1/14 and 1/13, between 1/13 and 1/12, between 1/12 and 1/11, between 1/11 and 1/10, between 1/10 and 1/9, between 1/9 and ⅛, between ⅛ and 1/7, or between 1/7 and ⅙) of the size of the area of the smallest convex polygon, with reference to any point in the portion of the touch control structure, an electrode ratio is in a range of 0.8 to 1.2.

In some embodiments, the area of the smallest convex polygon is in a range of 12.25 $mm^2$ to 16.00 $mm^2$, e.g. 12.25 $mm^2$ to 12.50 $mm^2$, 12.50 $mm^2$ to 12.75 $mm^2$, 12.75 $mm^2$ to 13.00 mm$^2$, 13.00 mm$^2$ to 13.25 mm$^2$, 13.25 mm$^2$ to 13.50 mm$^2$, 13.50 mm$^2$ to 13.75 mm$^2$, 13.75 mm$^2$ to 14.00 mm$^2$, 14.00 mm$^2$ to 14.25 mm$^2$, 14.25 mm$^2$ to 14.50 mm$^2$, 14.50 mm$^2$ to 14.75 mm$^2$, 14.75 mm$^2$ to 15.00 mm$^2$, 15.00 mm$^2$ to 15.25 mm$^2$, 15.25 mm$^2$ to 15.50 mm$^2$, 15.50 mm$^2$ to 15.75 mm$^2$, or 15.75 mm$^2$ to 16.00 mm$^2$.

FIG. 8 depicts an example of the smallest convex polygon SCP1 that encircles a respective first mesh block of the plurality of first mesh blocks. Optionally, the smallest convex polygon SCP1 has a rectangular shape as depicted in FIG. 8. In some embodiments, the electrode ratio in the smallest convex polygon that encircles a respective first mesh block of the plurality of first mesh blocks is in a range of 0.8 to 1.2, for example, 0.85 to 1.20, 0.90 to 1.20, 0.95 to 1.20, 1.00 to 1.20, 1.05 to 1.20, 1.10 to 1.20, 1.15 to 1.20, 0.80 to 1.15, 0.80 to 1.10, 0.80 to 1.05, 0.80 to 1.00, 0.80 to 0.95, 0.80 to 0.90, 0.80 to 0.85, 0.85 to 1.15, 0.90 to 1.10, 0.95 to 1.05, or 0.98 to 1.02, or 0.99 to 1.01.

FIG. 8 depicts an example of the smallest convex polygon SCP3 that encircles a respective third mesh block of the plurality of third mesh blocks. Optionally, the smallest convex polygon SCP3 has a rectangular shape as depicted in FIG. 8. In some embodiments, the electrode ratio in the smallest convex polygon that encircles a respective third mesh block of the plurality of third mesh blocks is in a range of 0.5 to 1.5, for example, 0.6 to 1.5, 0.7 to 1.5, 0.8 to 1.5, 0.9 to 1.5, 1.0 to 1.5, 1.1 to 1.5, 1.2 to 1.5, 1.3 to 1.5, 1.4 to 1.5, 0.5 to 1.4, 0.5 to 1.3, 0.5 to 1.2, 0.5 to 1.1, 0.5 to 1.0, 0.5 to 0.9, 0.5 to 0.8, 0.5 to 0.7, 0.5 to 0.6, 0.6 to 1.4, 0.7 to 1.3, 0.8 to 1.2, 0.9 to 1.1, 0.95 to 1.05, 0.98 to 1.02, or 0.99 to 1.01.

In some embodiments, in at least the portion of the touch control structure, inside the area defined by the active pen sensing range with reference to any point in the portion of the touch control structure, at least a portion of a dummy electrode is present.

In another aspect, the present disclosure provides a method of fabricating a touch control structure. In some embodiments, the method includes forming a plurality of first mesh electrodes respectively in a plurality of rows and forming a plurality of second mesh electrodes respectively in a plurality of columns. Optionally, forming a respective one of the plurality of second mesh electrodes includes forming a plurality of second mesh blocks consecutively connected in a respective column. Optionally, forming a respective one of the plurality of first mesh electrodes includes forming a plurality of first mesh blocks and a plurality of third mesh blocks alternately arranged in a respective row. Optionally, two adjacent second mesh blocks in a first adjacent column of second mesh blocks are formed to be connected respectively through a first conductive bridge and a second conductive bridge respectively crossing over the respective one of the plurality of first mesh electrodes. Optionally, two adjacent second mesh blocks in a second adjacent column of second mesh blocks are formed to be connected respectively through a third conductive bridge and a fourth conductive bridge respectively crossing over the respective one of the plurality of first mesh electrodes. Optionally, a respective third mesh block of the plurality of third mesh blocks is formed in a space between the first conductive bridge and the second conductive bridge in the first adjacent column. Optionally, a respective first mesh block of the plurality of first mesh blocks is formed in a space between the fourth conductive bridge in the second adjacent column and the first conductive bridge in the first adjacent column.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control structure, comprising a plurality of first mesh electrodes respectively in a plurality of rows and a plurality of second mesh electrodes respectively in a plurality of columns;

wherein a respective one of the plurality of second mesh electrodes comprises a plurality of second mesh blocks consecutively connected in a respective column;

wherein, in at least a portion of the touch control structure having at least four of the plurality of second mesh blocks, inside an active pen sensing area with reference to any point in the portion of the touch control structure, an electrode ratio of a first occupied area actually occupied by mesh lines of first mesh electrodes to a second occupied area actually occupied by mesh lines of second mesh electrodes is in a range of 0.8 to 1.2; and wherein a respective one of the plurality of first mesh electrodes comprises a plurality of first mesh blocks and a plurality of third mesh blocks alternately arranged in a respective row; and the electrode ratio in a smallest convex polygon that encircles a respective third mesh block of the plurality of third mesh blocks is in a range of 0.5 to 1.5.

2. The touch control structure of claim 1, wherein the electrode ratio in a smallest convex polygon that encircles a respective second mesh block of the plurality of second mesh blocks is in a range of 0.8 to 1.2.

3. The touch control structure of claim 1, wherein, inside any area having a size between 1/20 and 1/6 of the size of the area of the smallest convex polygon that encircles the respective second mesh block of the plurality of second mesh blocks, with reference to any point in the portion of the touch control structure, an electrode ratio is in a range of 0.8 to 1.2.

4. The touch control structure of claim 1, wherein the respective second mesh block has a substantially ⪤ shape, and the smallest convex polygon that encircles the respective second mesh block of the plurality of second mesh blocks has a rectangular shape.

5. The touch control structure of claim 1, wherein the active pen sensing area is a sensing area of an active pen comprising a tip having a diameter in a range of 0.8 mm to 2.0 mm.

6. The touch control structure of claim 1, wherein the area of the smallest convex polygon that encircles the respective second mesh block of the plurality of second mesh blocks is in a range of 12.25 $mm^2$ to 16.00 $mm^2$.

7. The touch control structure of claim 1, wherein the electrode ratio in a smallest convex polygon that encircles a respective first mesh block of the plurality of first mesh blocks is in a range of 0.8 to 1.2.

8. The touch control structure of claim 1, wherein, in at least the portion of the touch control structure, inside the area defined by the active pen sensing range with reference to any point in the portion of the touch control structure, at least a portion of a dummy electrode is present.

9. The touch control structure of claim 1, wherein a respective one of the plurality of first mesh electrodes comprises a plurality of first mesh blocks and a plurality of third mesh blocks alternately arranged in a respective row;

the respective second mesh block is in a space between a first adjacent third mesh block, a second adjacent third mesh block, a first adjacent first mesh block, a second adjacent first mesh block, a third adjacent first mesh block, and a fourth adjacent first mesh block;

a first portion of a respective third mesh block extends into a space between branches of a first adjacent second mesh block; and a second portion of the respective third mesh block extends into a space between branches of a second adjacent second mesh block.

10. The touch control structure of claim 1, wherein a respective second mesh block of the plurality of second mesh blocks comprises a connecting portion, a first branch, a second branch, a third branch, and a fourth branch, the first branch, the second branch, the third branch, and the fourth branch respectively connected to the connecting portion.

11. The touch control structure of claim 10, wherein two adjacent second mesh blocks in a first adjacent column of second mesh blocks are connected respectively through a first conductive bridge and a second conductive bridge respectively crossing over the respective one of the plurality of first mesh electrodes;

two adjacent second mesh blocks in a second adjacent column of second mesh blocks are connected respectively through a third conductive bridge and a fourth conductive bridge respectively crossing over the respective one of the plurality of first mesh electrodes;

a respective third mesh block of the plurality of third mesh blocks is in a space between the first conductive bridge and the second conductive bridge in the first adjacent column;

a respective first mesh block of the plurality of first mesh blocks is in a space between the fourth conductive bridge in the second adjacent column and the first conductive bridge in the first adjacent column; and the respective first mesh block of the plurality of first mesh blocks is in a space between the third branch of a first adjacent second mesh block, the first branch of a second adjacent second mesh block, the fourth branch of a third adjacent second mesh block, the second branch of a fourth adjacent second mesh block, the fourth conductive bridge in the second adjacent column, and the first conductive bridge in the first adjacent column, the first adjacent second mesh block and the second adjacent second mesh block being in the first adjacent column, the third adjacent second mesh block and the fourth adjacent second mesh block being in the second adjacent column, the first conductive bridge in the first adjacent column connecting the third branch of the first adjacent second mesh block and the first branch of the second adjacent second mesh block, the fourth conductive bridge in the second adjacent column connecting the fourth branch of the third adjacent second mesh block and the second branch of the fourth adjacent second mesh block.

12. The touch control structure of claim 11, wherein a first portion of the respective first mesh block extends into a space between the third branch of the first adjacent second mesh block and the fourth branch of the third adjacent second mesh block; and a second portion of the respective first mesh block extends into a space between the first branch of the second adjacent second mesh block and the second branch of the fourth adjacent second mesh block.

13. A display apparatus, comprising a display panel, the touch control structure of claim 1 on the display panel, and a plurality of touch control integrated circuits connect to the touch control structure.

14. A touch control structure, comprising a plurality of first mesh electrodes respectively in a plurality of rows and a plurality of second mesh electrodes respectively in a plurality of columns;

wherein a respective one of the plurality of second mesh electrodes comprises a plurality of second mesh blocks consecutively connected in a respective column;

wherein, in at least a portion of the touch control structure having at least four of the plurality of second mesh blocks, inside an active pen sensing area with reference to any point in the portion of the touch control structure, an electrode ratio of a first occupied area actually occupied by mesh lines of first mesh electrodes to a second occupied area actually occupied by mesh lines of second mesh electrodes is in a range of 0.8 to 1.2; and wherein a respective one of the plurality of first mesh electrodes comprises a plurality of first mesh blocks and a plurality of third mesh blocks alternately arranged in a respective row;

the respective second mesh block is in a space between a first adjacent third mesh block, a second adjacent third mesh block, a first adjacent first mesh block, a second adjacent first mesh block, a third adjacent first mesh block, and a fourth adjacent first mesh block;

a first portion of a respective third mesh block extends into a space between branches of a first adjacent second mesh block; and a second portion of the respective third mesh block extends into a space between branches of a second adjacent second mesh block, wherein two adjacent second mesh blocks in a first adjacent column of second mesh blocks are connected through at least a first conductive bridge crossing over the respective one of the plurality of first mesh electrodes;

two adjacent second mesh blocks in a second adjacent column of second mesh blocks are connected through at least a third conductive bridge crossing over the respective one of the plurality of first mesh electrodes; and the first conductive bridge and the third conductive bridge respectively cross over respective conductive channels connecting respective adjacent pairs of first mesh block and third mesh block.

15. A touch control structure, comprising a plurality of first mesh electrodes respectively in a plurality of rows and a plurality of second mesh electrodes respectively in a plurality of columns;

wherein a respective one of the plurality of second mesh electrodes comprises a plurality of second mesh blocks consecutively connected in a respective column;

wherein, in at least a portion of the touch control structure having at least four of the plurality of second mesh blocks, inside an active pen sensing area with reference to any point in the portion of the touch control structure, an electrode ratio of a first occupied area actually occupied by mesh lines of first mesh electrodes to a second occupied area actually occupied by mesh lines of second mesh electrodes is in a range of 0.8 to 1.2; and wherein a respective second mesh block of the plurality of second mesh blocks comprises a connecting portion, a first branch, a second branch, a third branch, and a fourth branch, the first branch, the second branch, the third branch, and the fourth branch respectively connected to the connecting portion;

wherein two adjacent second mesh blocks in a first adjacent column of second mesh blocks are connected respectively through a first conductive bridge and a second conductive bridge respectively crossing over the respective one of the plurality of first mesh electrodes;

two adjacent second mesh blocks in a second adjacent column of second mesh blocks are connected respectively through a third conductive bridge and a fourth conductive bridge respectively crossing over the respective one of the plurality of first mesh electrodes;

a respective third mesh block of the plurality of third mesh blocks is in a space between the first conductive bridge and the second conductive bridge in the first adjacent column;

a respective first mesh block of the plurality of first mesh blocks is in a space between the fourth conductive bridge in the second adjacent column and the first conductive bridge in the first adjacent column; and the respective third mesh block of the plurality of third mesh blocks is in a space between the third branch and the fourth branch of a first adjacent second mesh block, the first branch and the second branch of a second adjacent second mesh block, the first conductive bridge in the first adjacent column, and the second conductive bridge in the first adjacent column, the first adjacent second mesh block and the second adjacent second mesh block being in the first adjacent column, the first conductive bridge in the first adjacent column connecting the third branch of the first adjacent second mesh block and the first branch of the second adjacent second mesh block, the second conductive bridge in the first adjacent column connecting the fourth branch of the first adjacent second mesh block and the second branch of the second adjacent second mesh block.

16. The touch control structure of claim 15, wherein a first portion of the respective third mesh block extends into a space between the third branch and the fourth branch of a first adjacent second mesh block; and a second portion of the respective third mesh block extends into a space between the first branch and the second branch of a second adjacent second mesh block.

* * * * *